Figure 13:
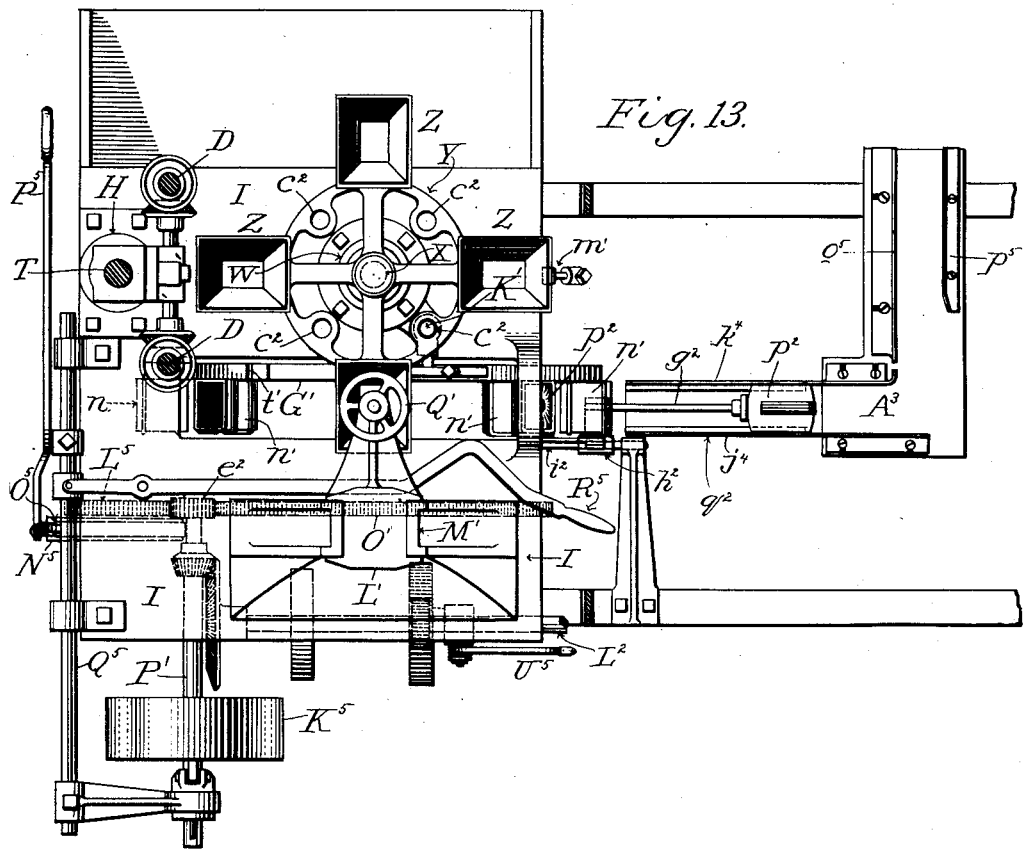

(No Model.) 25 Sheets—Sheet 1.
R. L. PATTERSON.
MACHINE FOR WEIGHING, PACKING, STAMPING, AND LABELING.
No. 579,546. Patented Mar. 23, 1897.
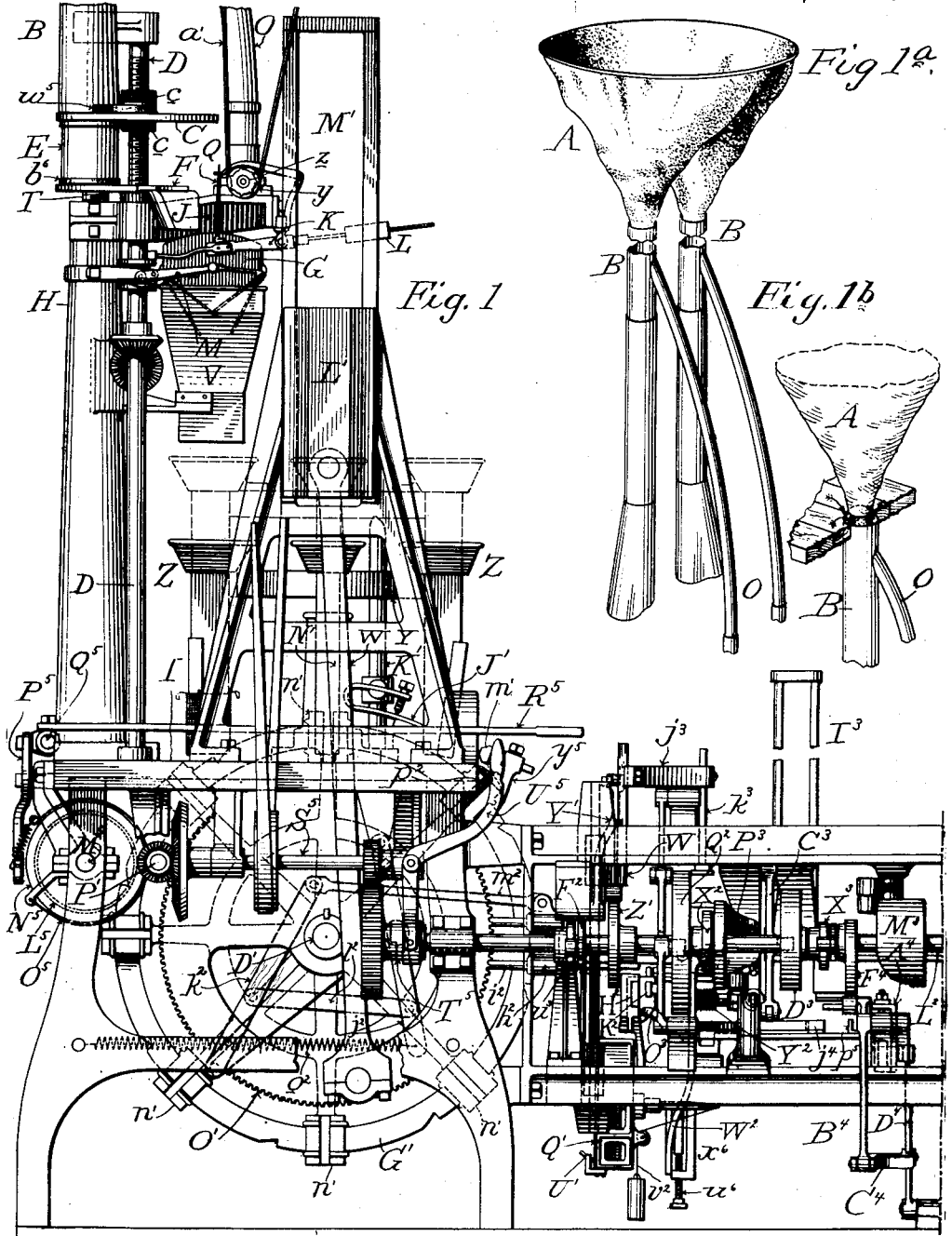
Witnesses
C. C. Burdine.
J. M. Pond.
Inventor:
Rufus L. Patterson,
Dodge & Sons,
Attorneys.

(No Model.) 25 Sheets—Sheet 2.
R. L. PATTERSON.
MACHINE FOR WEIGHING, PACKING, STAMPING, AND LABELING.
No. 579,546. Patented Mar. 23, 1897.
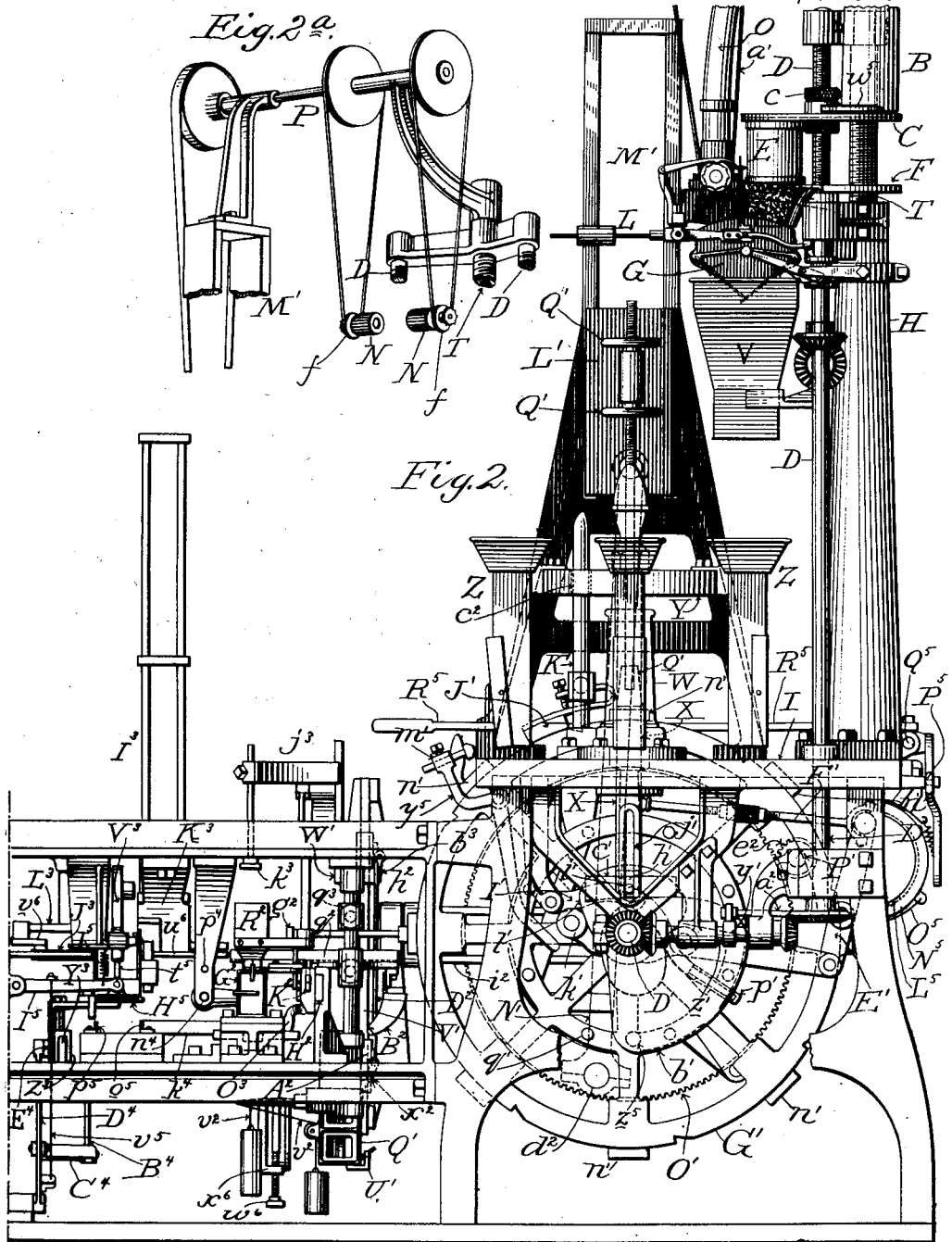
Witnesses
C. C. Burdine
J. M. Pond
Inventor:
Rufus L. Patterson,
by Dodge Sons,
Attorneys.

(No Model.)   25 Sheets—Sheet 3.
R. L. PATTERSON.
MACHINE FOR WEIGHING, PACKING, STAMPING, AND LABELING.
No. 579,546. Patented Mar. 23, 1897.
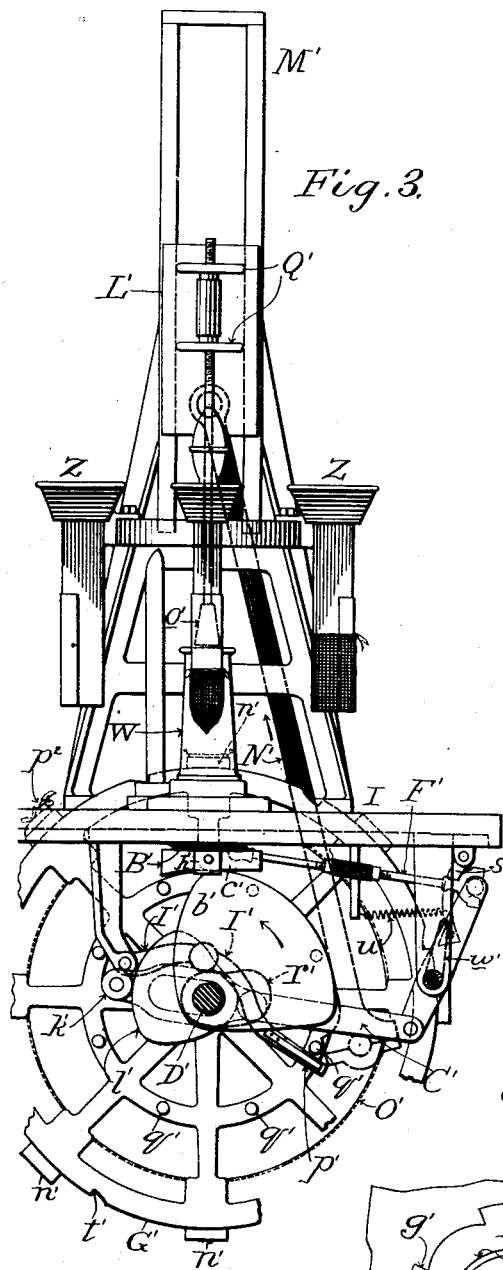
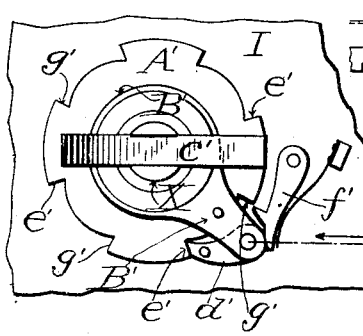
Fig. 9.
Witnesses
A. C. Bindine
J. M. Pond
Inventor:
Rufus L. Patterson,
by Dodge & Son,
Attorneys.

(No Model.) 25 Sheets—Sheet 4.
R. L. PATTERSON.
MACHINE FOR WEIGHING, PACKING, STAMPING, AND LABELING.
No. 579,546. Patented Mar. 23, 1897.
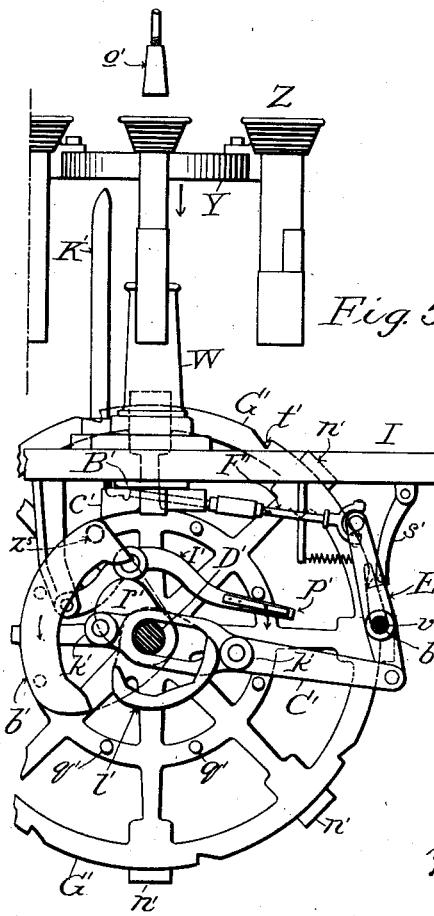
Fig. 5.
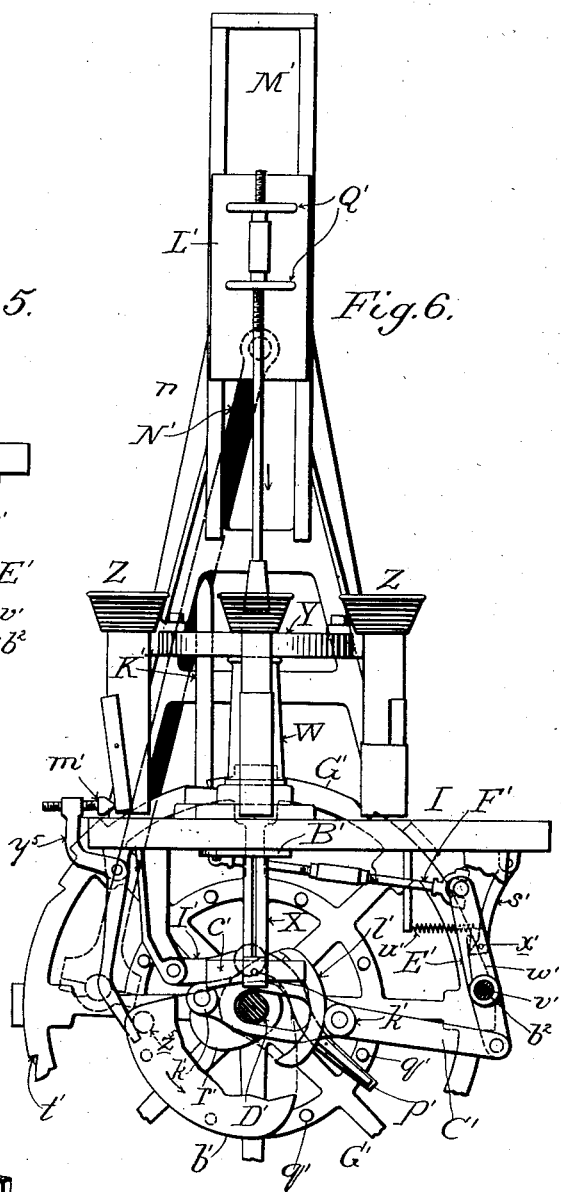
Fig. 6.
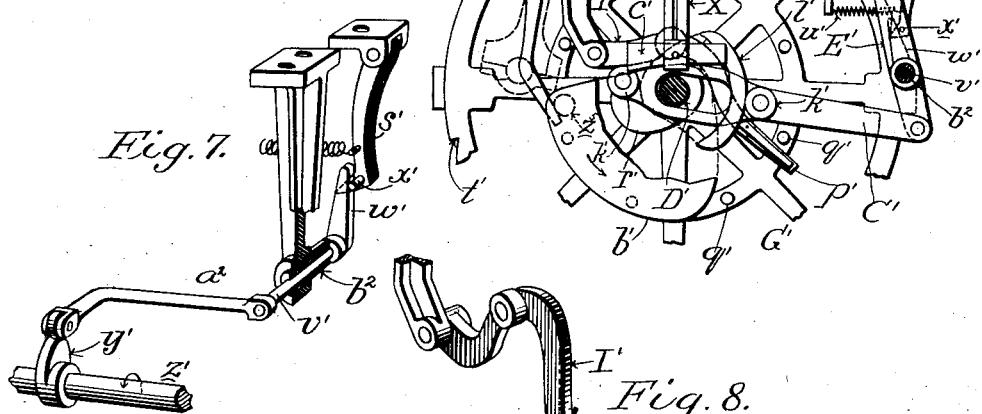
Fig. 7.
Fig. 8.
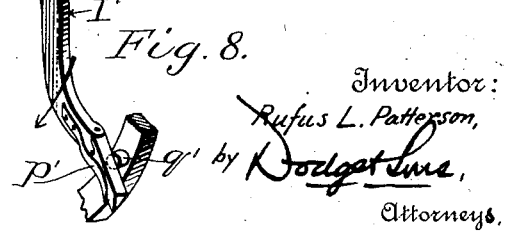
Witnesses
C. C. Burdine.
J. M. Pond.
Inventor:
Rufus L. Patterson,
by Dodge & Lune,
Attorneys.

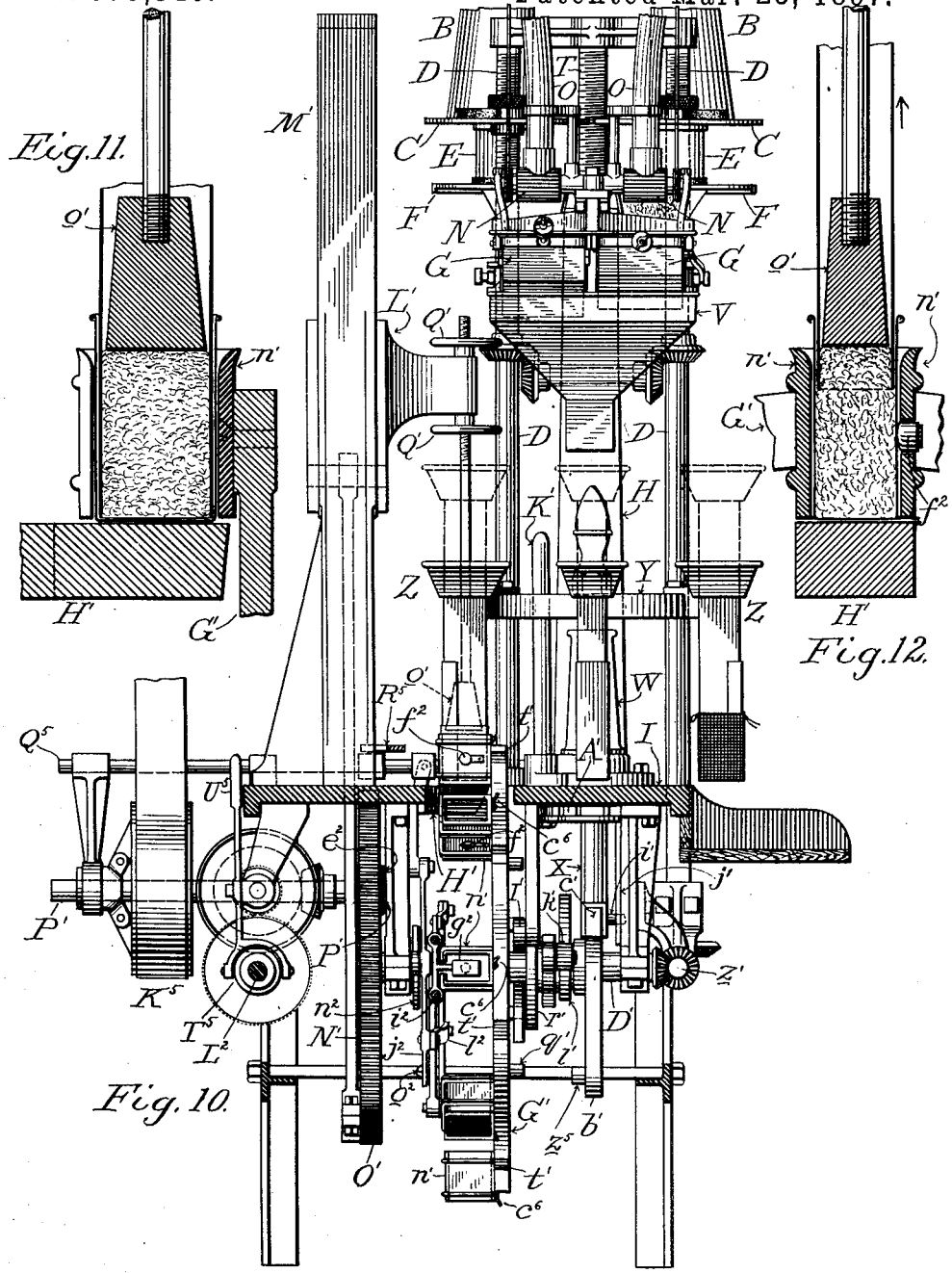

(No Model.) 25 Sheets—Sheet 6.

R. L. PATTERSON.
MACHINE FOR WEIGHING, PACKING, STAMPING, AND LABELING.

No. 579,546. Patented Mar. 23, 1897.

Witnesses
C. C. Burdine
J. M. Pond

Inventor:
Rufus L. Patterson,
by Dodge & Sons,
Attorney (No Model.)

25 Sheets—Sheet 11.

R. L. PATTERSON.
MACHINE FOR WEIGHING, PACKING, STAMPING, AND LABELING.

No. 579,546.

Patented Mar. 23, 1897.

Witnesses
C. C. Burdine
J. M. Pond.

Inventor:
Rufus L. Patterson,
by Dodge & Sons,
Attorneys.

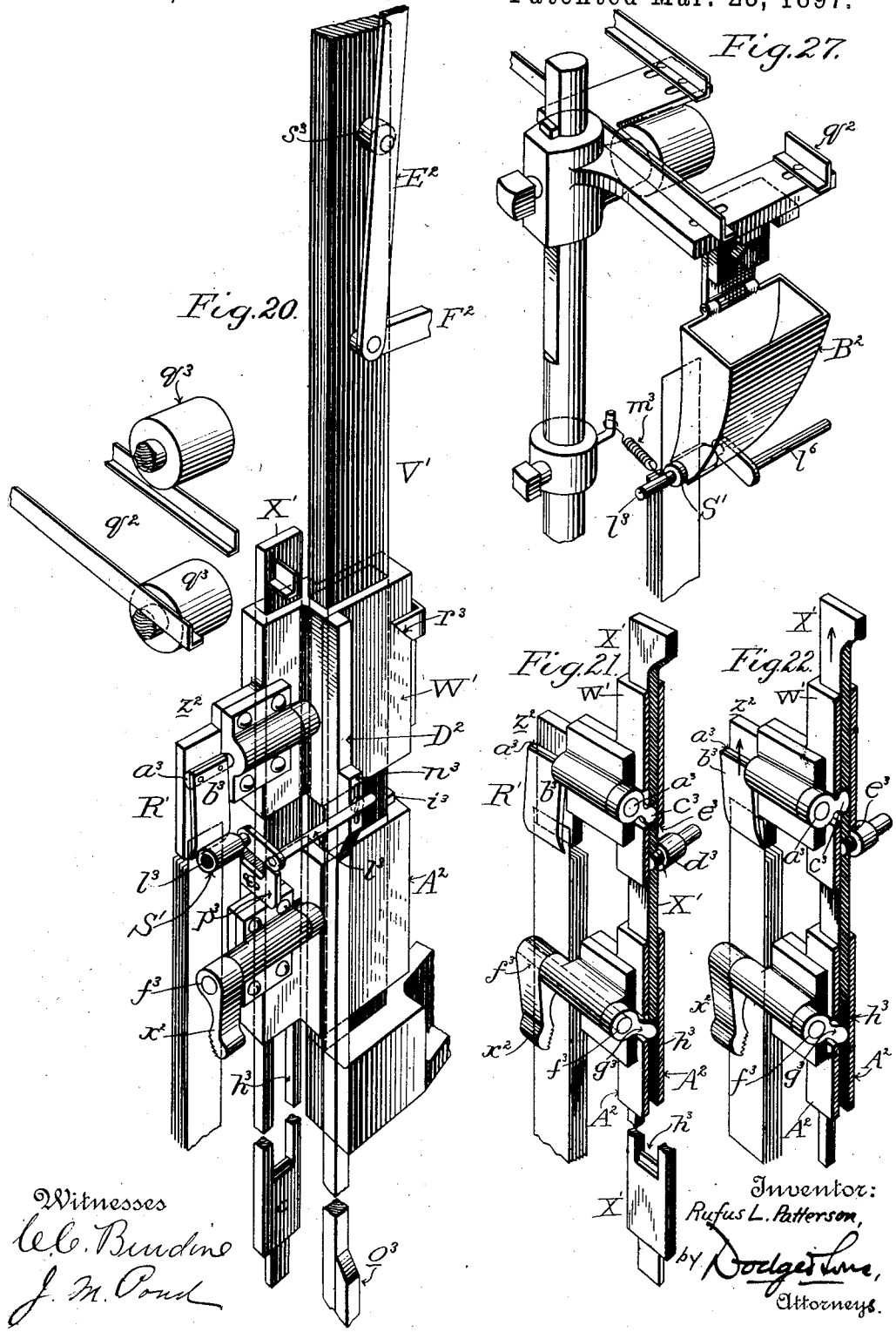

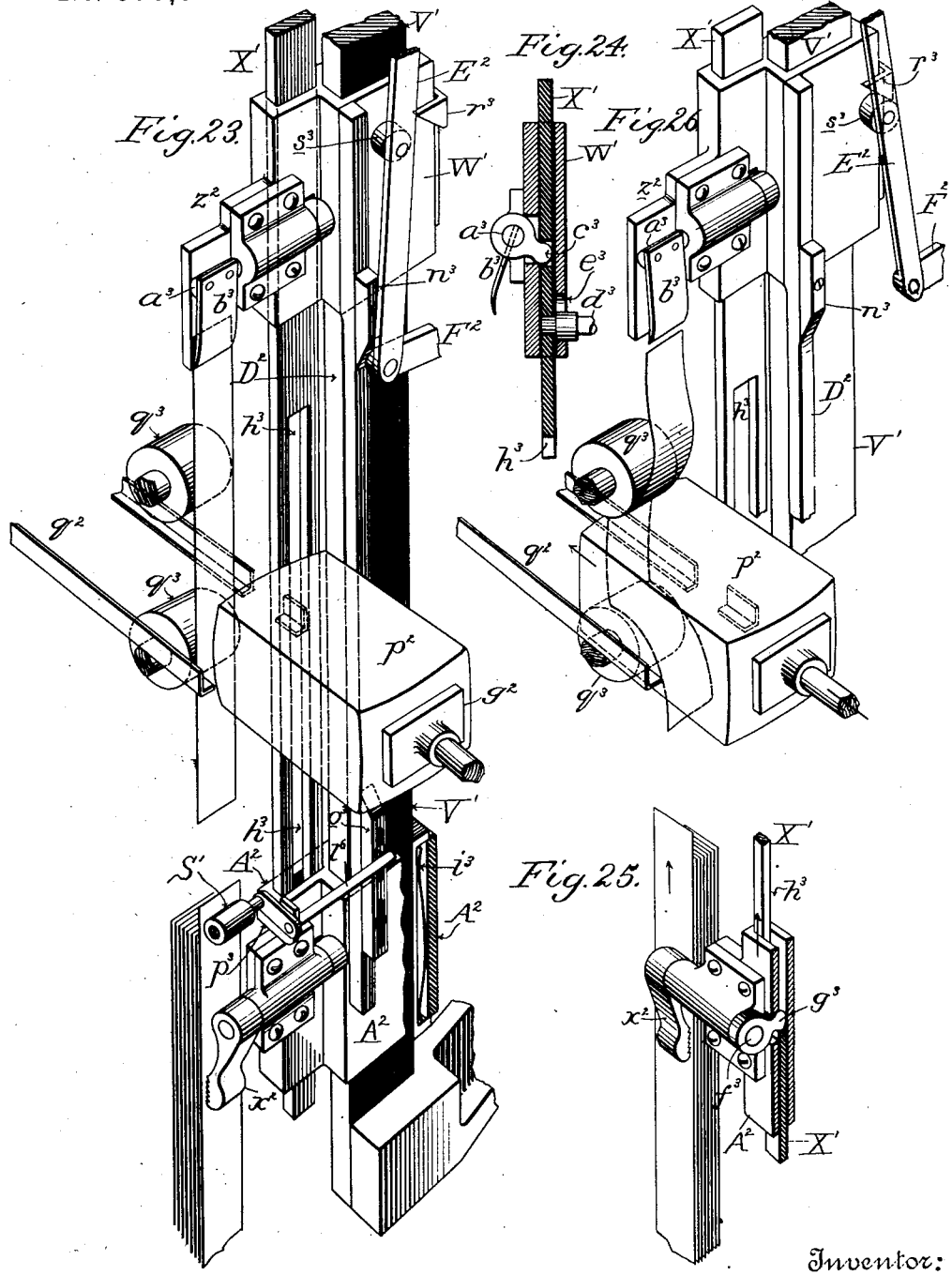

(No Model.) 25 Sheets—Sheet 14.
R. L. PATTERSON.
MACHINE FOR WEIGHING, PACKING, STAMPING, AND LABELING.

No. 579,546. Patented Mar. 23, 1897.

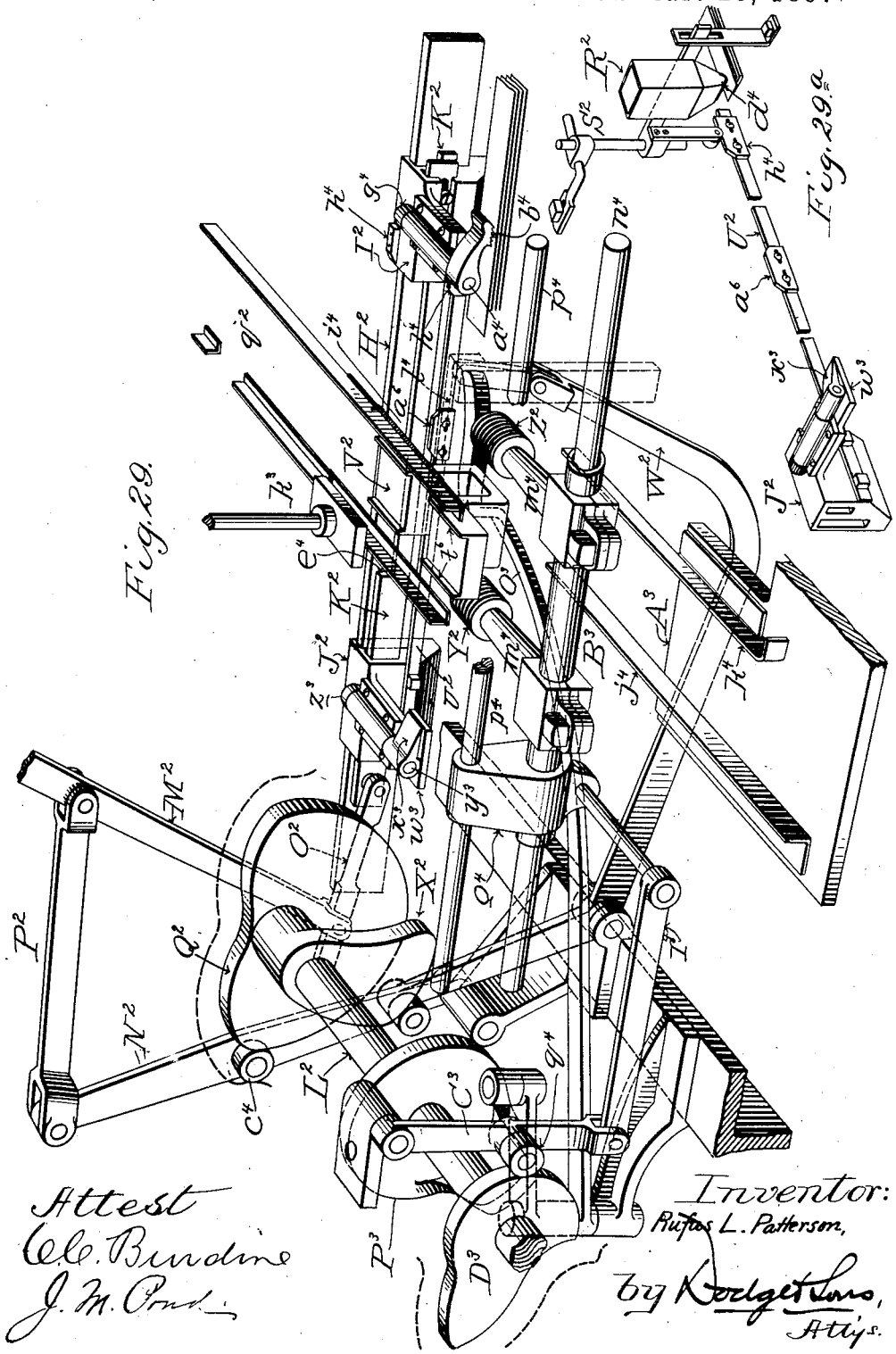

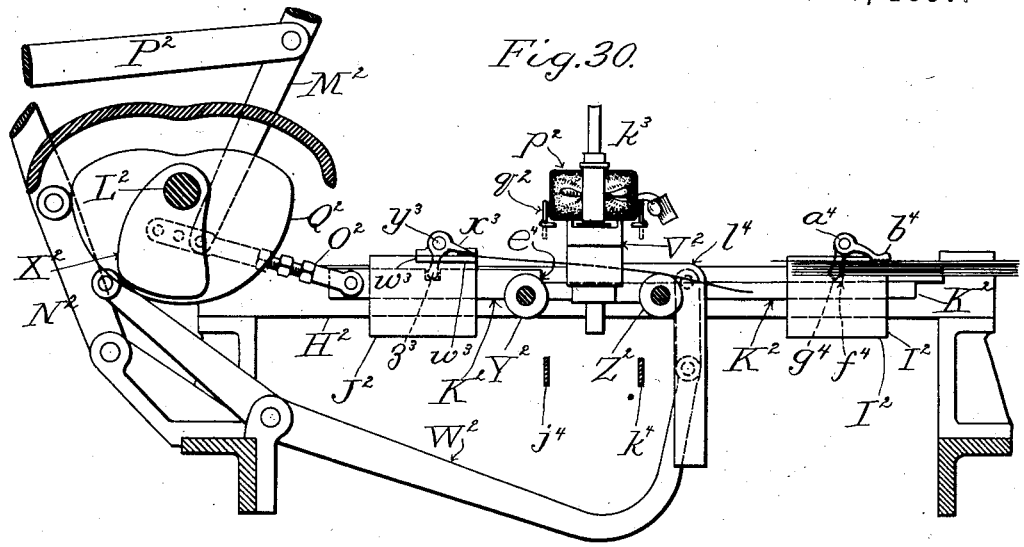
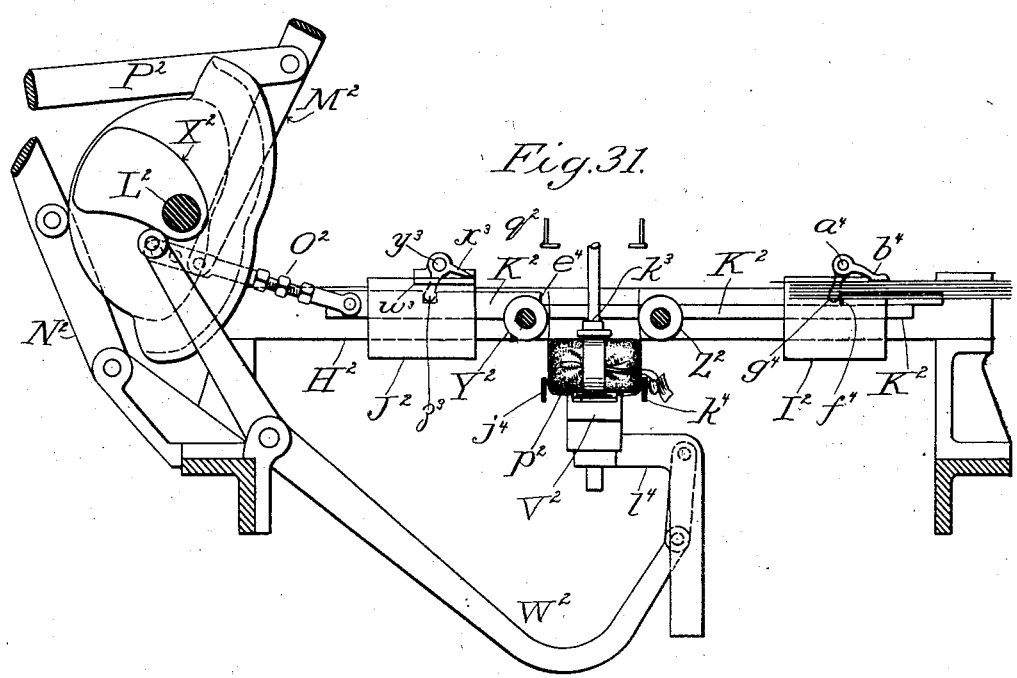

(No Model.) 25 Sheets—Sheet 17.
R. L. PATTERSON.
MACHINE FOR WEIGHING, PACKING, STAMPING, AND LABELING.
No. 579,546. Patented Mar. 23, 1897.
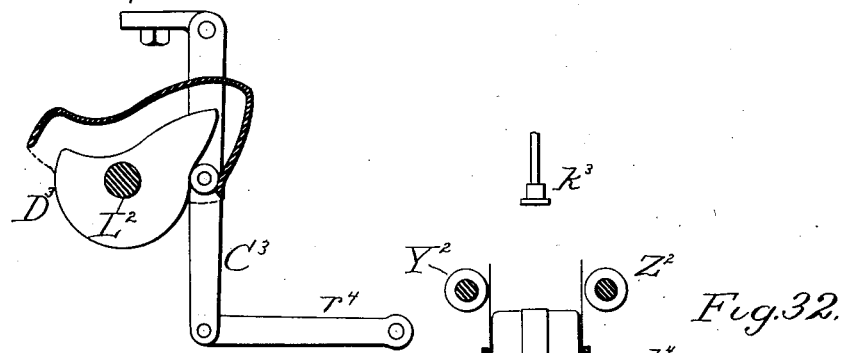
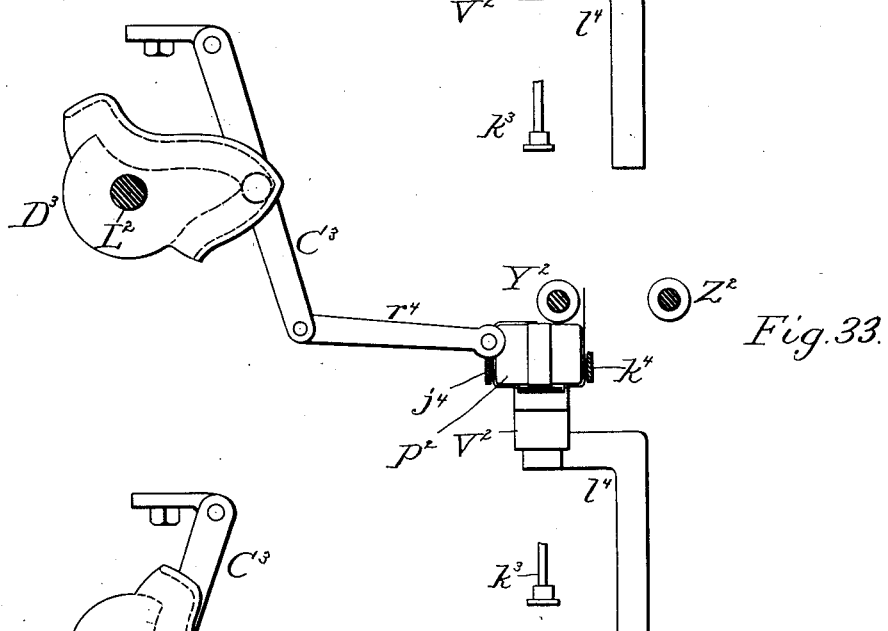
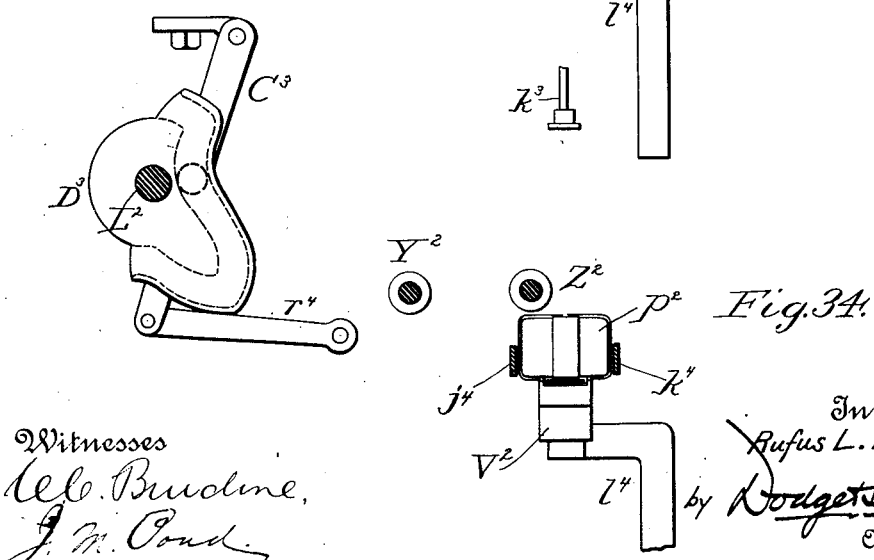
Witnesses
Inventor:
Rufus L. Patterson,
by Dodge & Sons,
Attorneys.

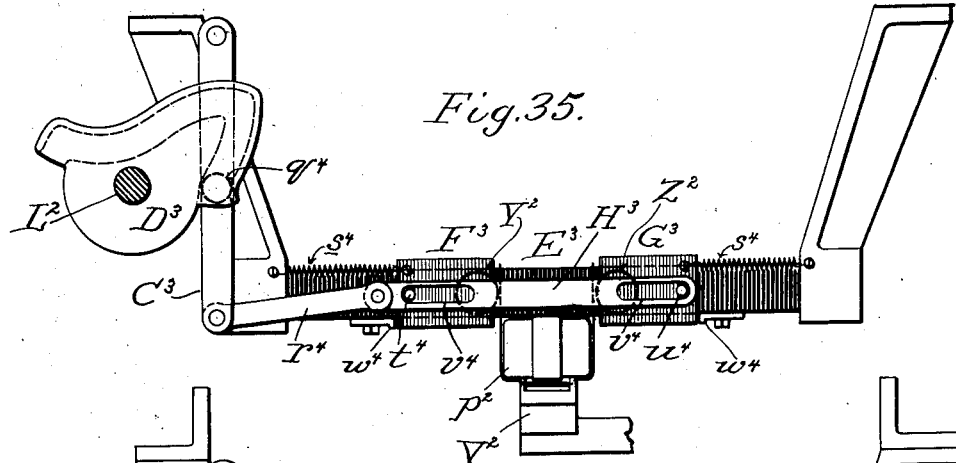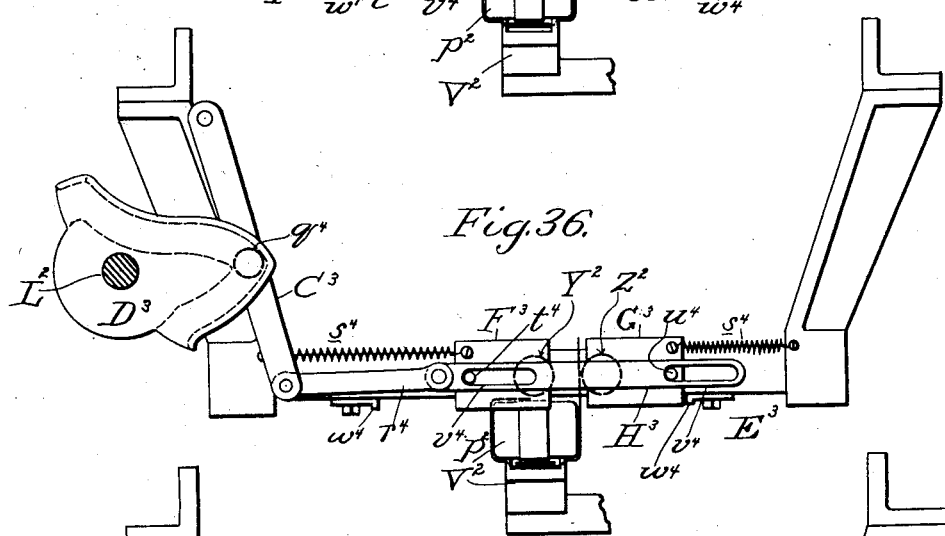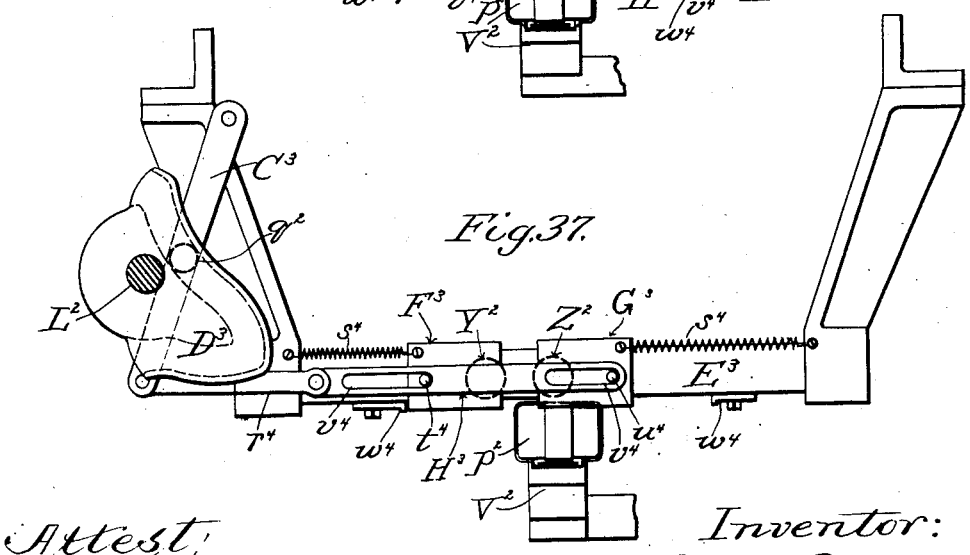

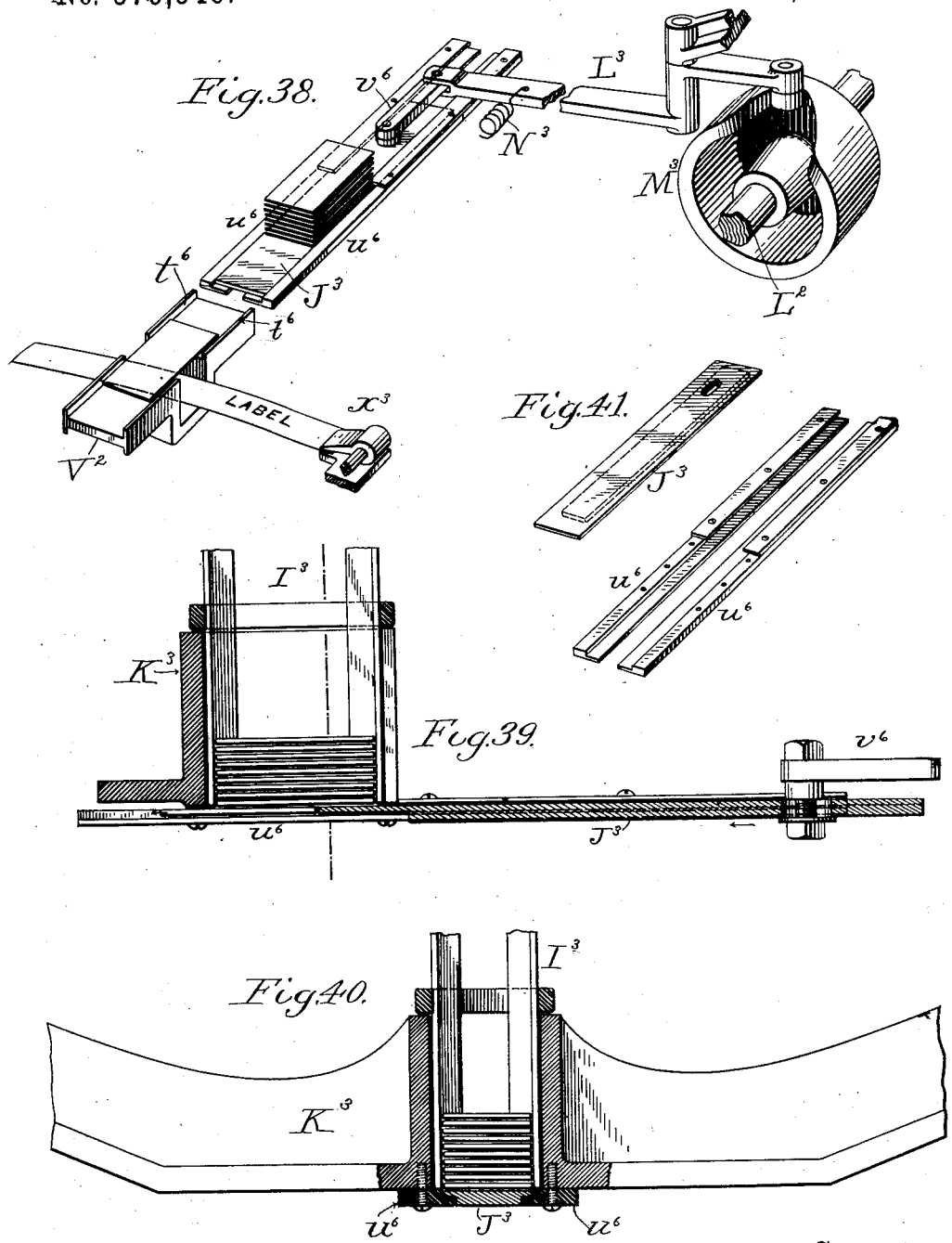

(No Model.)
25 Sheets—Sheet 20.
R. L. PATTERSON.
MACHINE FOR WEIGHING, PACKING, STAMPING, AND LABELING.
No. 579,546.
Patented Mar. 23, 1897.
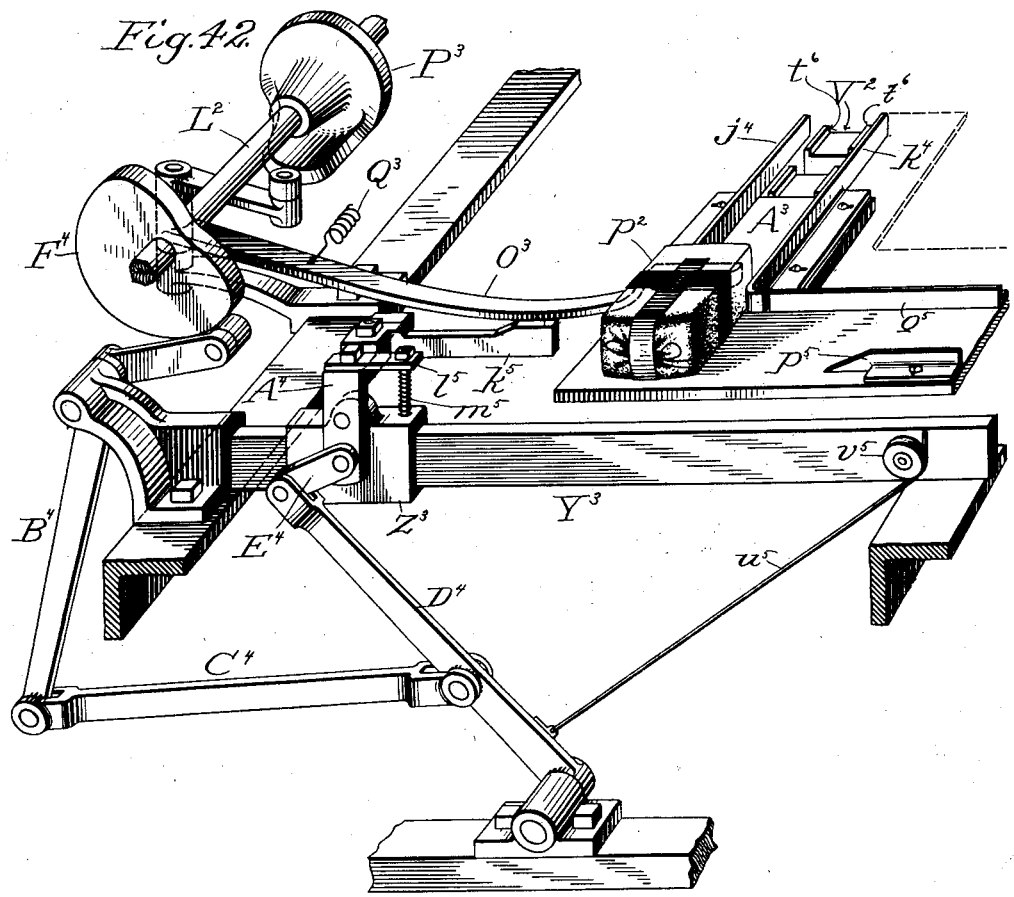
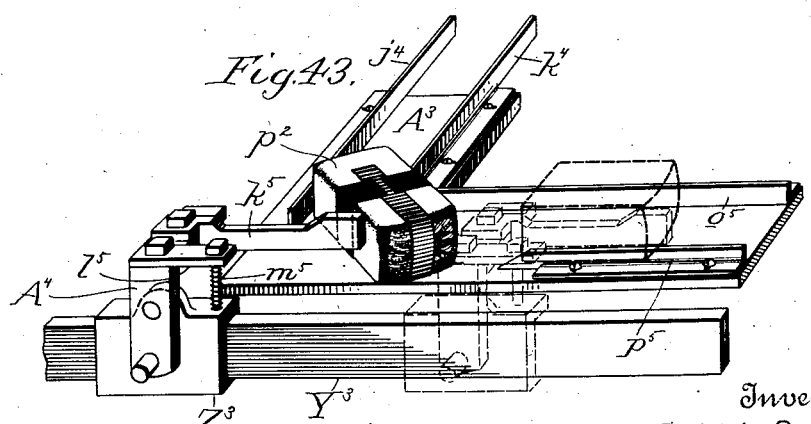
Witnesses
Inventor:
Rufus L. Patterson,
by Dodge & Sons,
Attorneys.

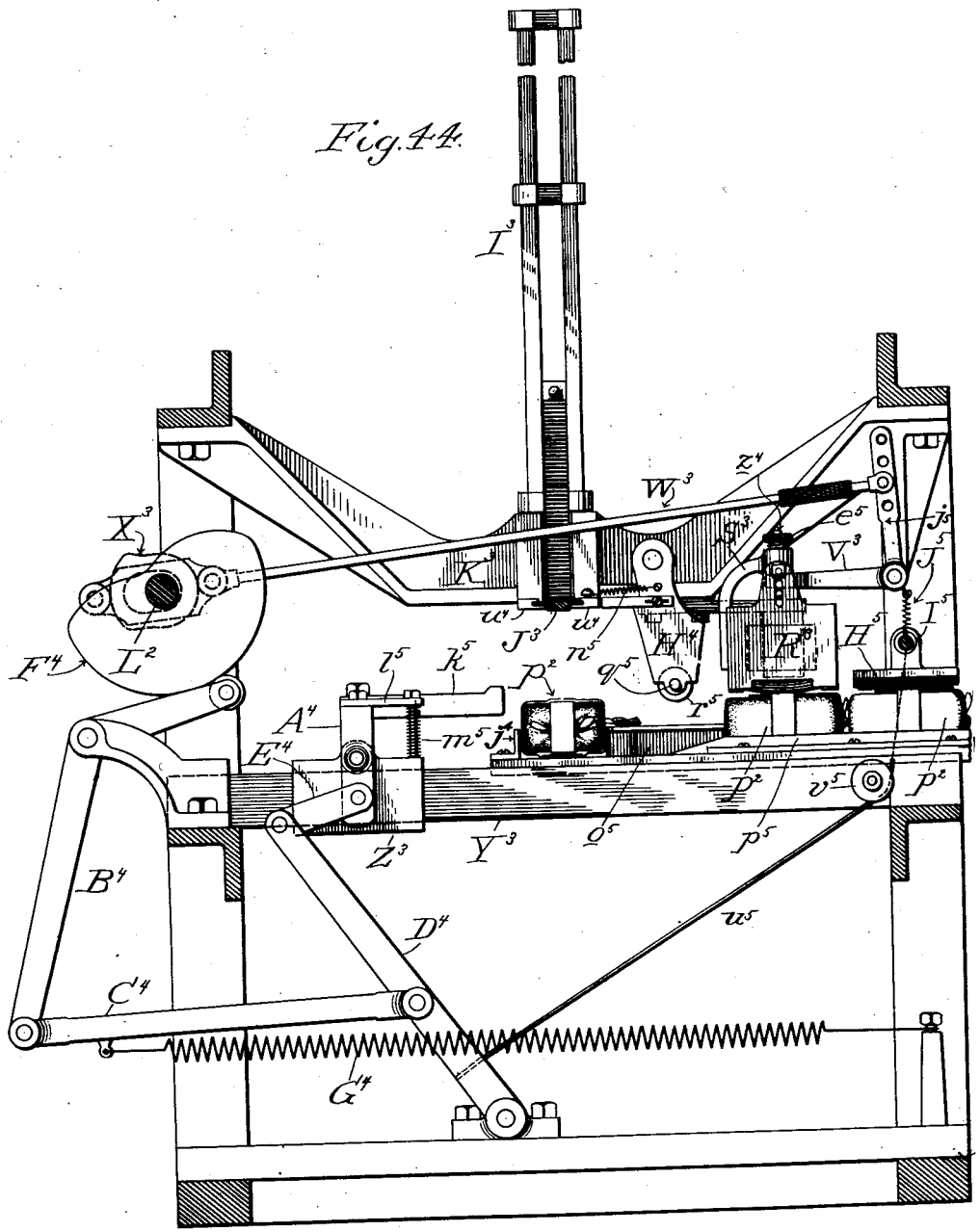

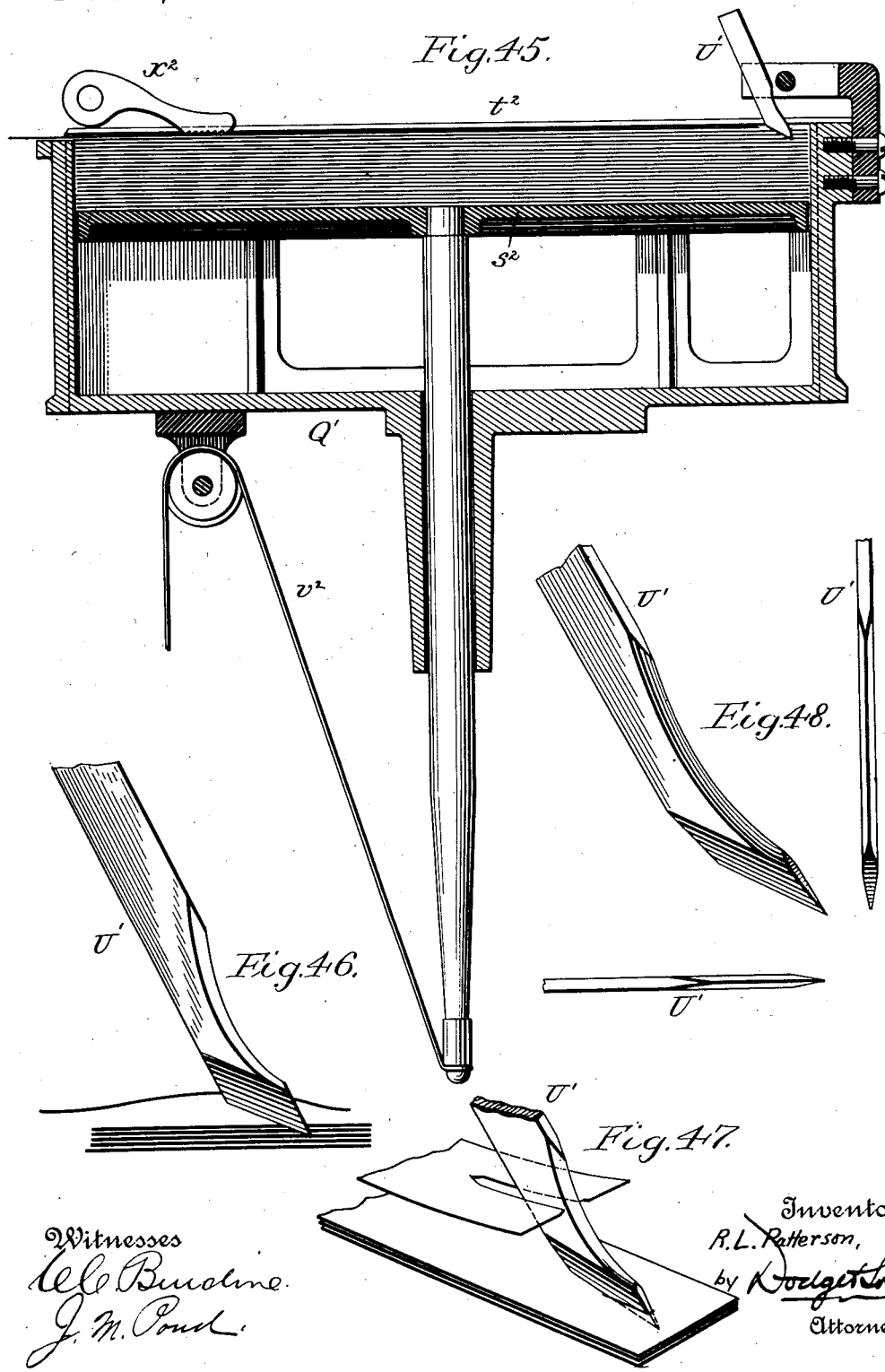

(No Model.) 25 Sheets—Sheet 23.
R. L. PATTERSON.
MACHINE FOR WEIGHING, PACKING, STAMPING, AND LABELING.
No. 579,546. Patented Mar. 23, 1897.
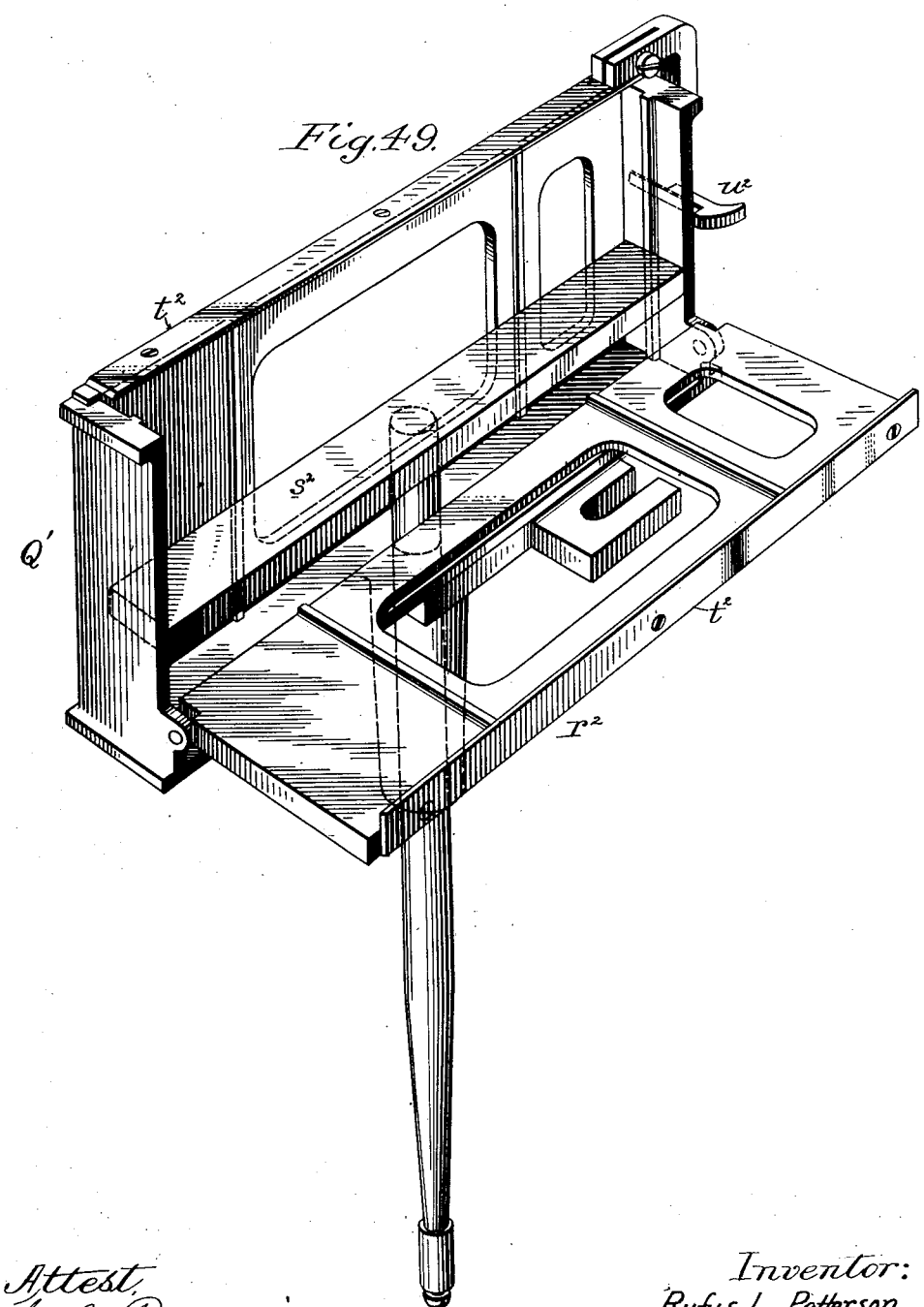

(No Model.)
25 Sheets—Sheet 24.
R. L. PATTERSON.
MACHINE FOR WEIGHING, PACKING, STAMPING, AND LABELING.
No. 579,546.
Patented Mar. 23, 1897.
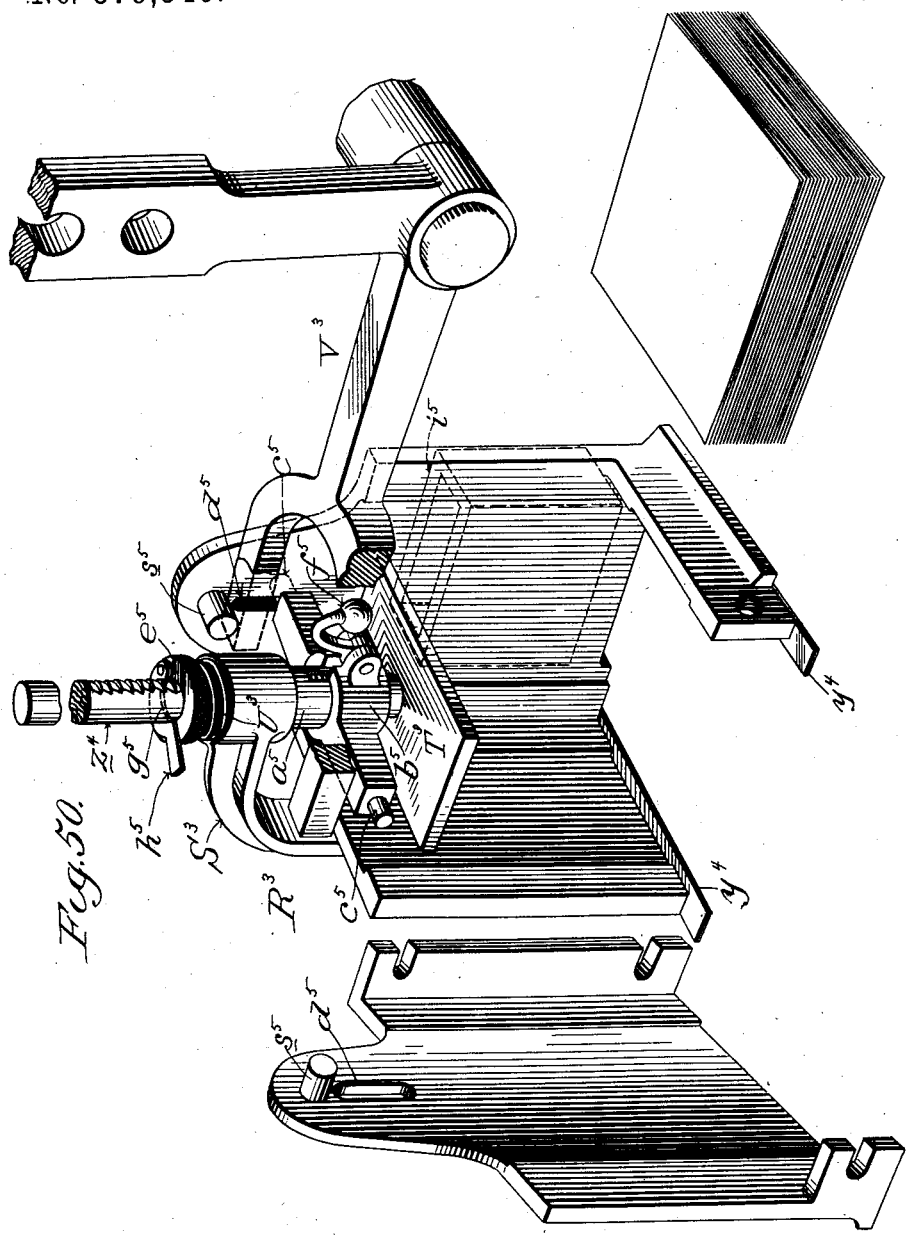
Witnesses
C. C. Budine
J. M. Pond
Inventor:
Rufus L. Patterson,
by Dodge & Sons,
Attorneys.

(No Model.) 25 Sheets—Sheet 25.
R. L. PATTERSON.
MACHINE FOR WEIGHING, PACKING, STAMPING, AND LABELING.
No. 579,546. Patented Mar. 23, 1897.
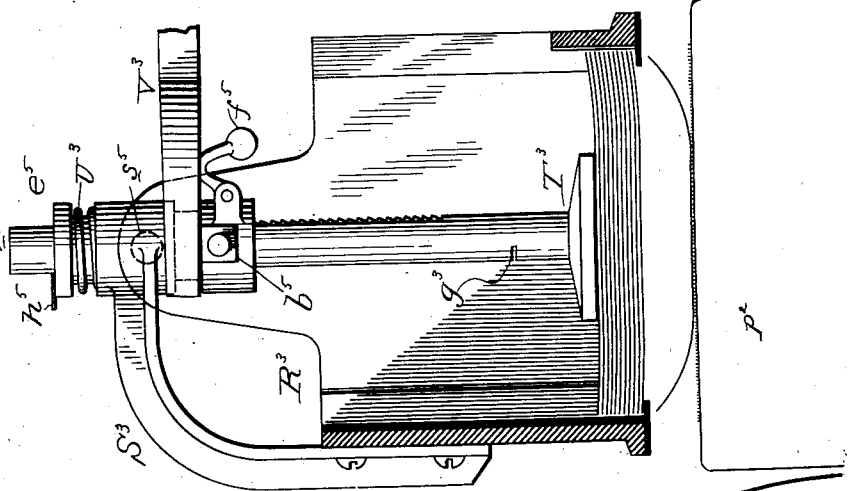
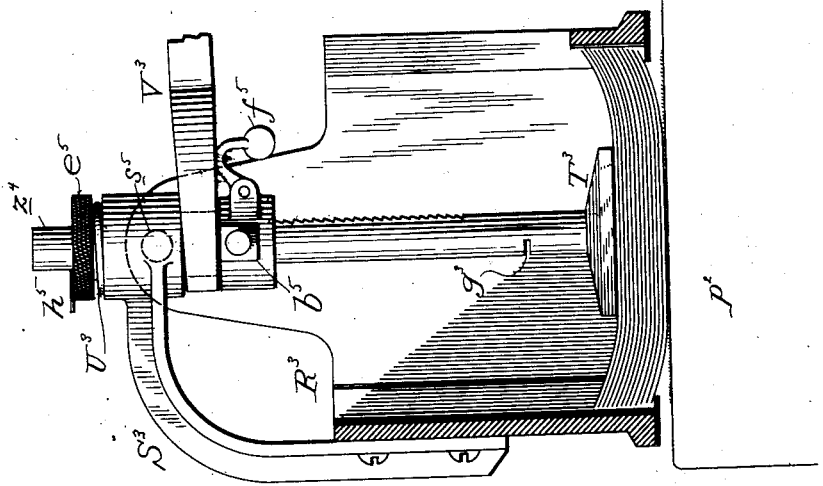
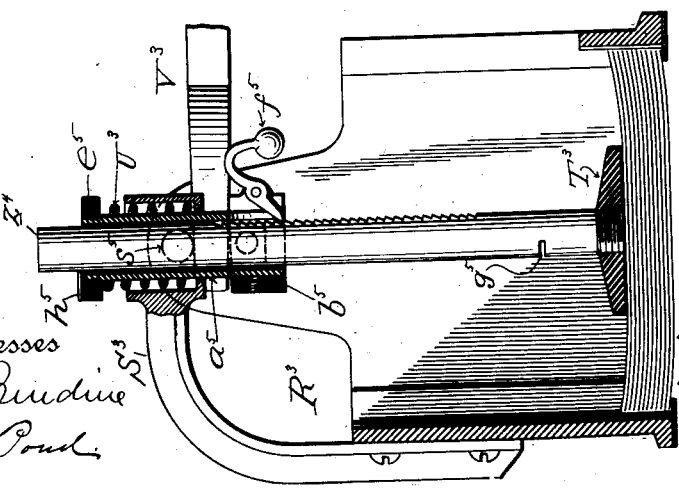
Witnesses
Inventor:
Rufus L. Patterson,
by Dodge & Sons,
Attorneys.

UNITED STATES PATENT OFFICE.

RUFUS L. PATTERSON, OF DURHAM, NORTH CAROLINA, ASSIGNOR TO THE AUTOMATIC PACKING AND LABELING COMPANY, OF SAME PLACE.

MACHINE FOR WEIGHING, PACKING, STAMPING, AND LABELING.

SPECIFICATION forming part of Letters Patent No. 579,546, dated March 23, 1897.

Application filed March 21, 1896. Serial No. 584,271. (No model.)

*To all whom it may concern:*

Be it known that I, RUFUS L. PATTERSON, a citizen of the United States, residing at Durham, in the county of Durham and State of North Carolina, have invented certain new and useful Improvements in Machines for Weighing, Packing, Stamping, and Labeling, of which the following is a specification.

This invention relates to machinery for packing tobacco and like materials or substances, and in its fullest development comprises mechanism for feeding, measuring, and weighing the product, for delivering it into bags, compressing it to proper density and thereby giving to the package the required form and size, for applying and securing a revenue-stamp and suitable label or labels, and, when desired, supplying and securing upon the package a book or bundle of cigarette papers or wrappers.

While the complete machine comprises the various mechanisms thus recited, various of the parts are susceptible of separate or independent use. Hence, while the combination of the several parts is claimed, the separate mechanisms and subcombinations are likewise claimed *per se*. In other words, the invention consists not only in the complete organization, but also in various features, details, and subcombinations, which will be duly pointed out in the specification and specified in the claims.

The accompanying drawings illustrate one embodiment of the complete invention, showing also various mechanisms detached from other parts of the machine for better illustration and to indicate how they may be utilized independently of such other parts or devices.

For convenience of explanation and designation I shall call that end of the machine at which the tobacco feeding, measuring, and weighing apparatus is located the "front" end of the machine and shall treat as the right-hand side that side which is at the right of an observer facing the front end of the machine thus defined.

Figure 14:
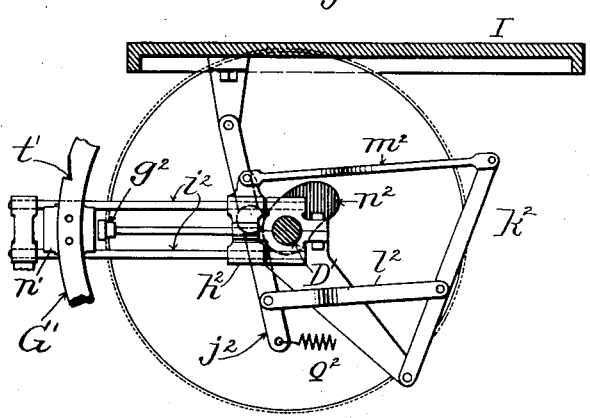
Figure 15:
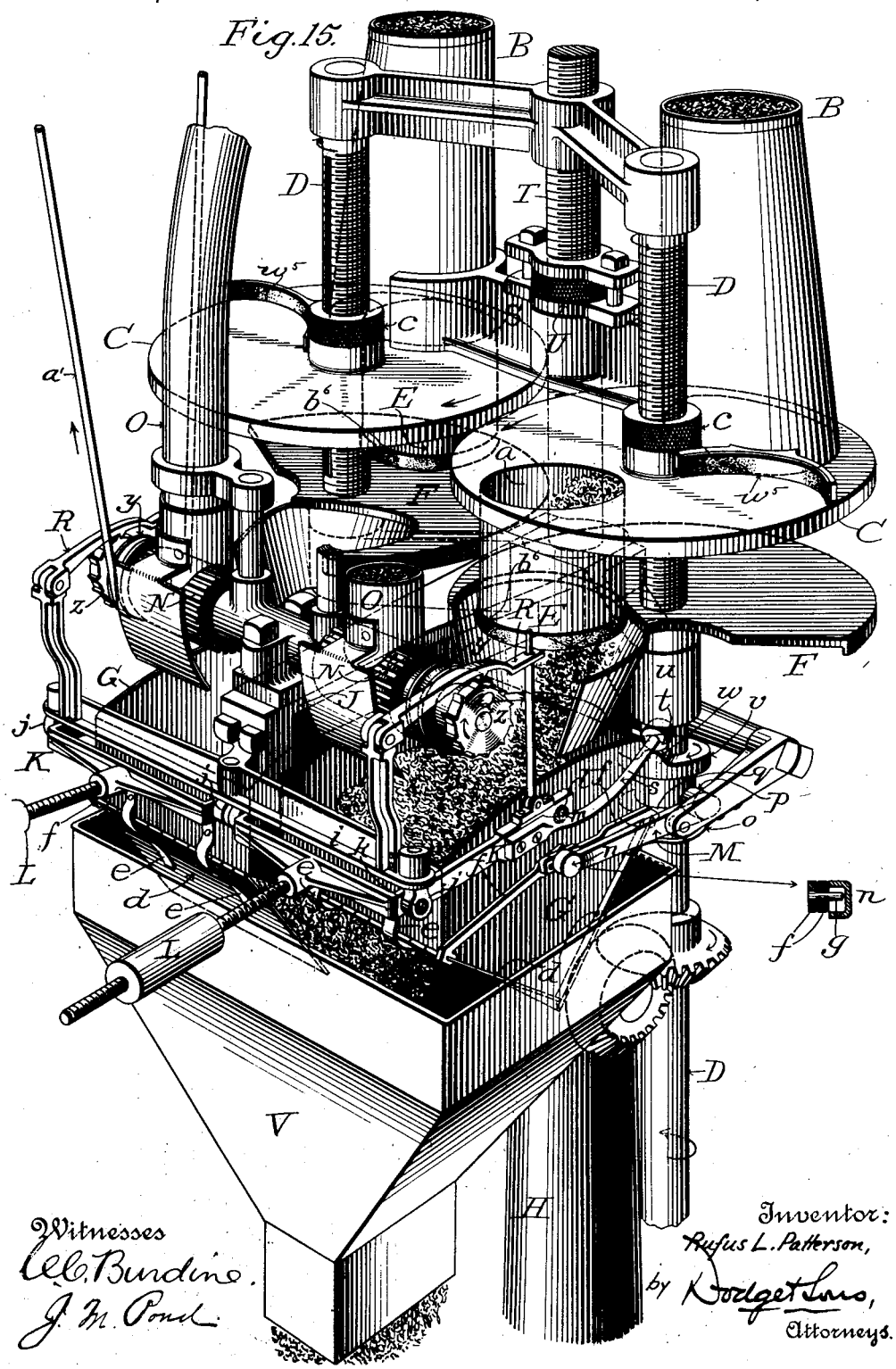
Figure 16:
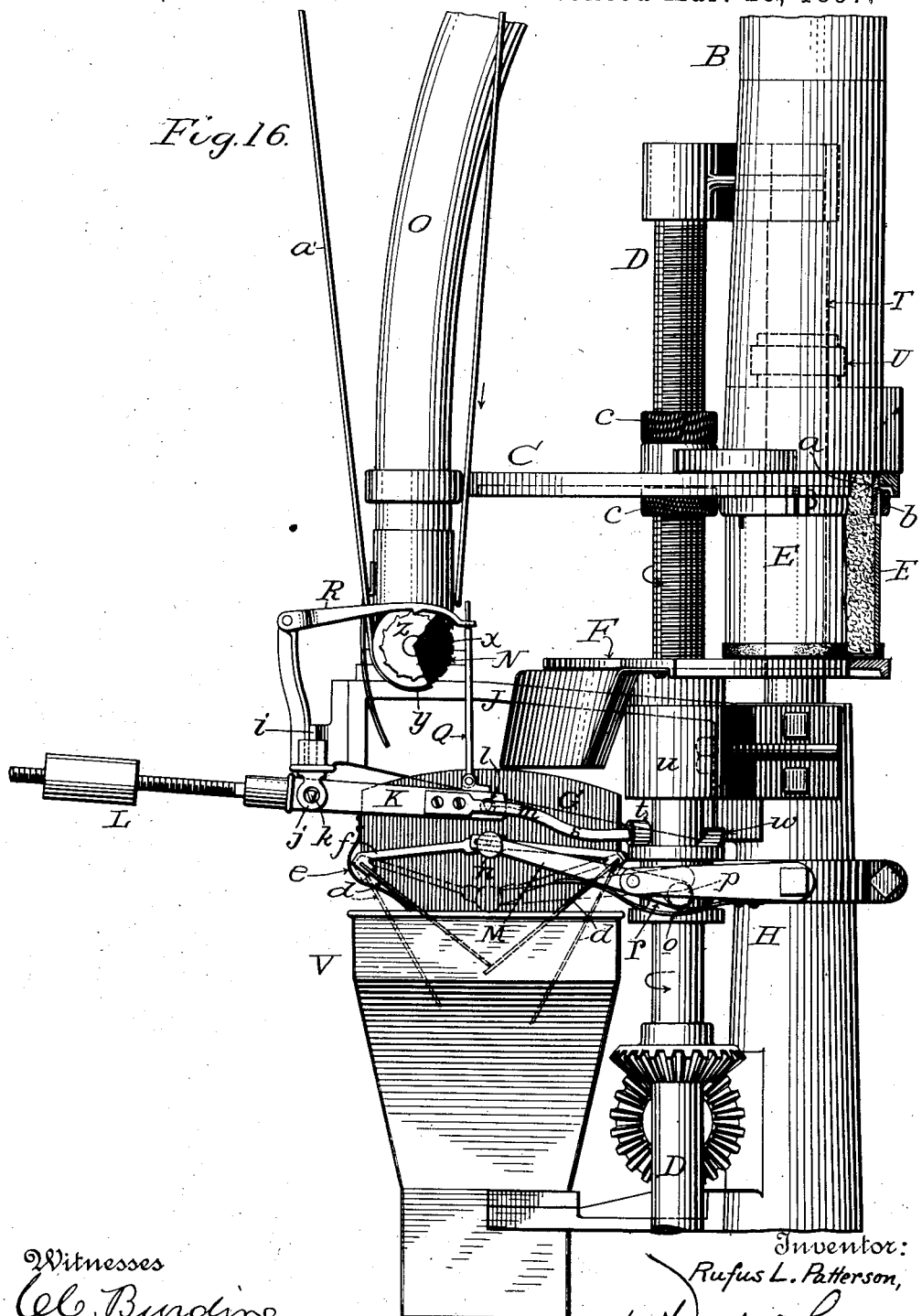
Figure 17:
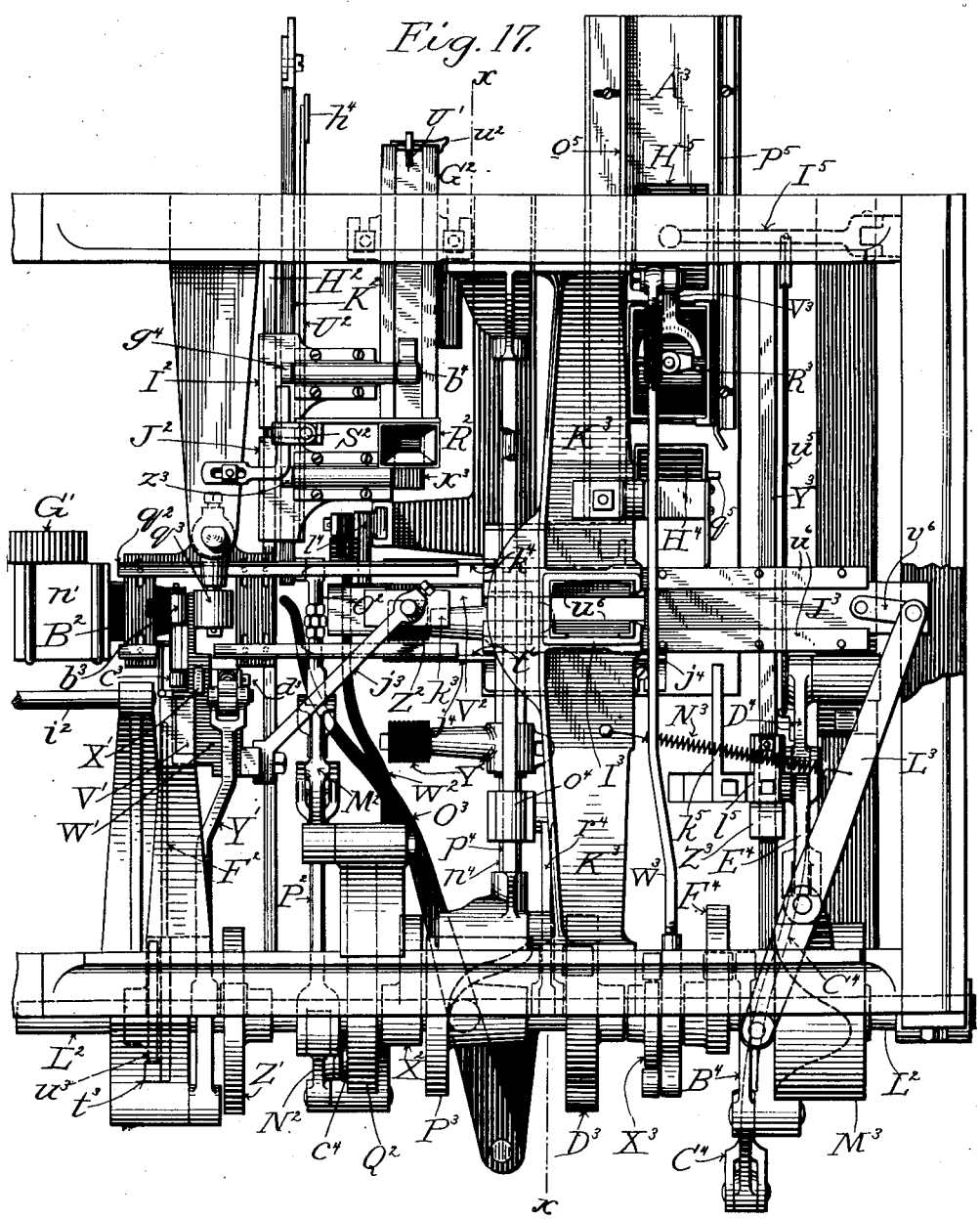
Figure 18:
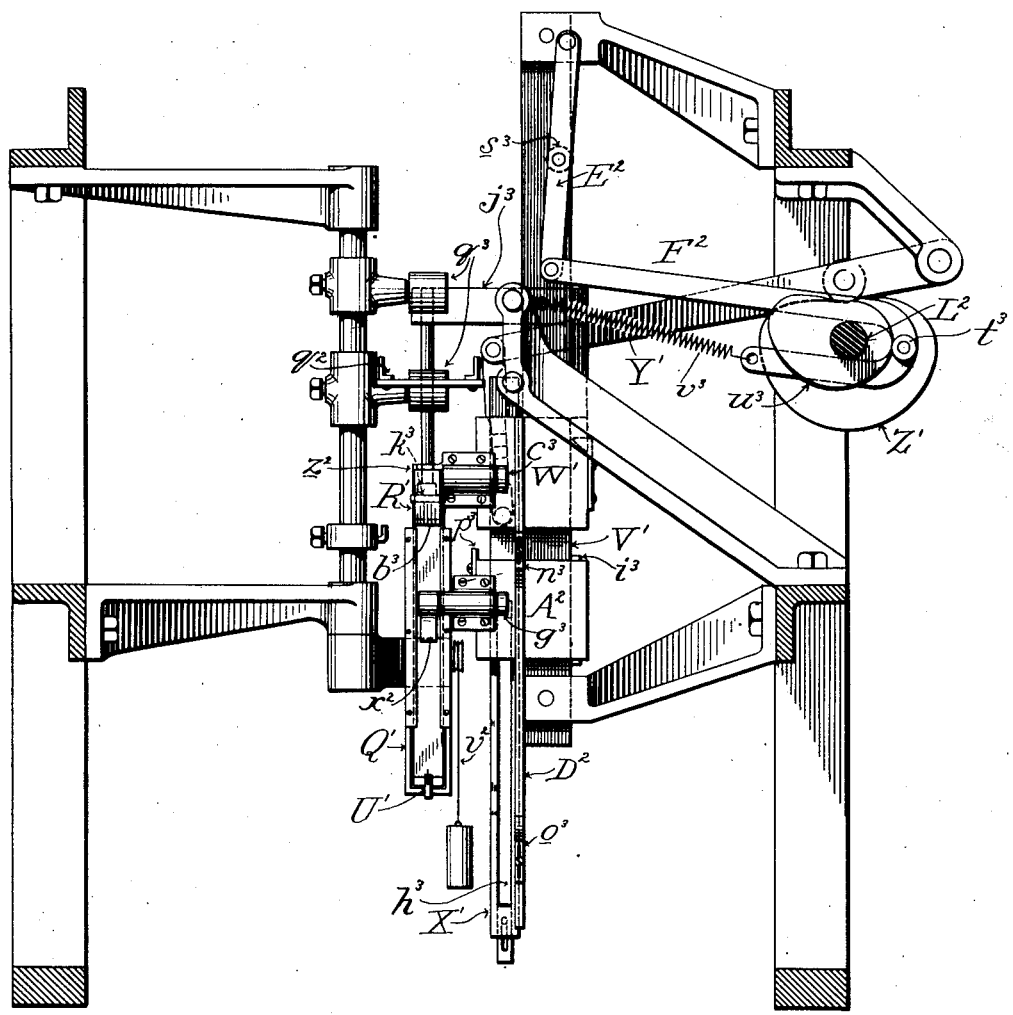
Figure 19:
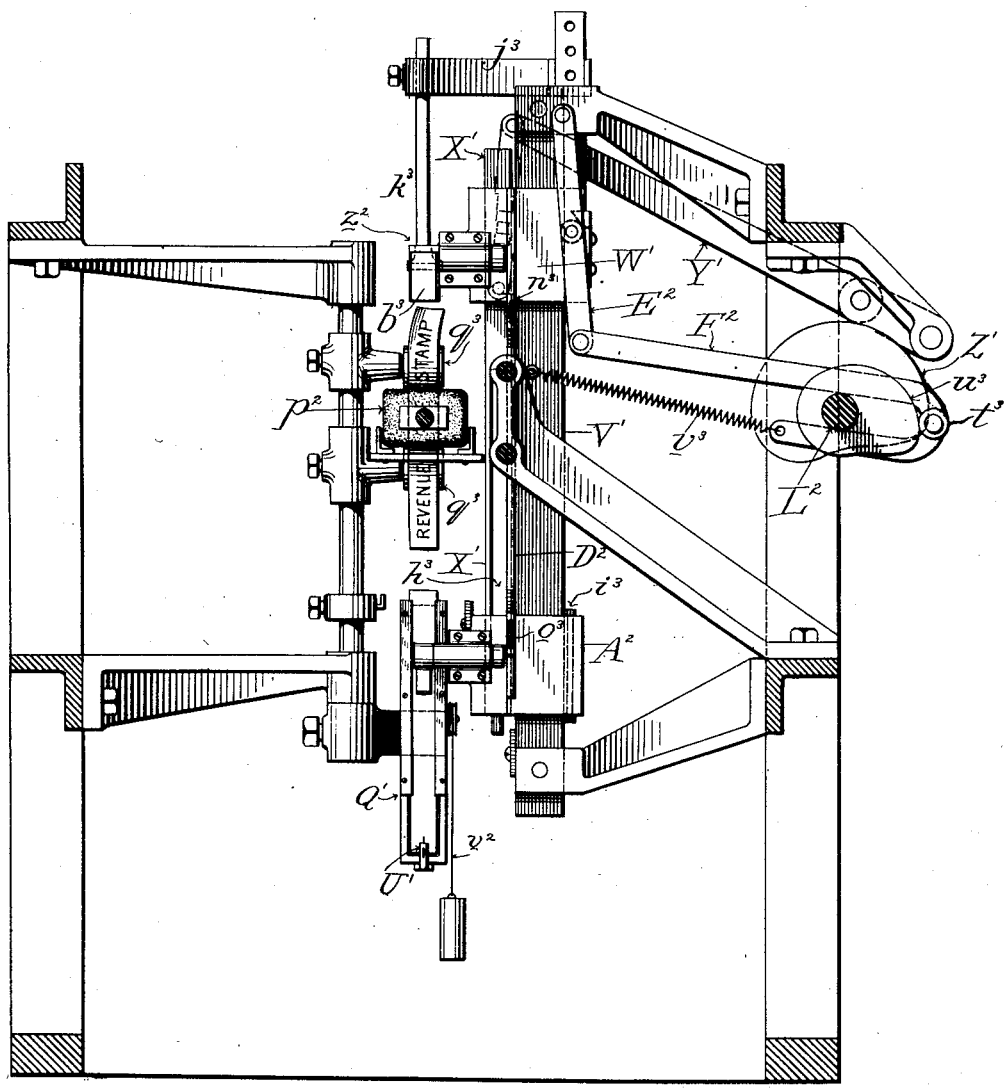

Figure 1 is a side elevation of the complete machine viewed from the right; Fig. 1ª, a detached perspective view of the feed hopper and spouts, which cannot be seen in Fig. 1 for lack of space; Fig. 2, a side elevation of the machine, looking from the left; Fig. 2ª, a view showing the counter-shaft at the top of the machine, necessarily broken off in Fig. 2; Fig. 3, an elevation showing the shape-carrier and plunger rising to their elevated positions; Fig. 4, a similar elevation showing the shape-carrier in the act of making a quarter-revolution, the plunger being at its highest point; Fig. 5, an elevation with some parts omitted, showing the shape-carrier at the end of its quarter-rotation and ready to descend; Fig. 6, an elevation showing the shape-carrier lowered and the plunger at or near its lowermost position; Fig. 7, a perspective view of the mechanism for withdrawing the dog or pawl which engages the shape-wheel and holds it against rotation while the package is being pressed; Fig. 8, a perspective view of the lever through which the shape-wheel is advanced step by step, illustrating particularly its laterally-swinging pawl; Fig. 9, a bottom view of a portion of the bed or table of the machine, showing the devices for rotating and for locking the shape-carrier; Fig. 10, a face view of the weighing and compressing mechanism; Figs. 11 and 12, sectional views of the bag-shapes, plunger, &c.; Fig. 13, a top plan view of the bed or table of the machine and of the shape-carrier, shape-wheel, plunger, &c.; Fig. 14, a detail view of the mechanism for pushing the charged bag or compressed package from the shape-wheel into and through the stamp-applying devices; Fig. 15, a perspective view of the cut-off, measuring, and weighing apparatus; Fig. 16, a side elevation of the same; Fig. 17, a top plan view of the stamp and label applying mechanisms; Fig. 18, an elevation of the stamp-applying mechanism, showing the grippers in the act of seizing a stamp preparatory to withdrawing it from the holder; Fig. 19, an elevation of the same parts with the grippers raised, the stamp released therefrom, and the bag and stamp in the act of passing between the stamp-pressing rollers; Figs. 20 to 26, inclusive, detail views showing the construction and operation of the gripper and feeder by which the stamp is placed in the path of the bag; Fig. 27, a perspective view illustrating details of the stamp-pasting devices Fig. 28, a section on the line x x of Fig. 17 through the "district-label"-attaching devices, showing the grippers starting forward with the label and the bag coming into position to be forced downward upon the label and between the rollers which press the label upon the bag; Fig. 29, a perspective view of the actuating mechanism of the district-label-applying devices; Fig. 29$^a$, a view of a part of the mechanism of Fig. 29 detached; Figs. 30 to 34, inclusive, diagrammatic views illustrating the operation performed in applying the district label; Figs. 35, 36, and 37, views illustrating a preferred construction of the district-label-applying devices; Fig. 38, a diagrammatic perspective view illustrating the manner of placing books or packages of cigarette-papers upon the bag or package support or table; Figs. 39, 40, and 41, details of the apparatus for feeding and applying the cigarette-paper packages; Figs. 42 and 43, perspective views showing the manner of transferring the bag from one track or runway to another and carrying it to the final-label-applying devices; Fig. 44, an elevation of the apparatus for applying the final label; Figs. 45 to 49, inclusive, details of the stamp and district-label holders; Figs. 50 to 53, inclusive, detail views of the box or holder for containing the main or final label.

The purpose of this invention is to produce a machine which shall perform the work now requiring an extended series of manual operations, leaving but little to be performed by the attendant or attendants in charge of the machine. When operating with granular substances of a firm and non-adhesive nature, these operations may be readily performed, and operative mechanism for the purpose is relatively easy to design and construct; but some substances or materials, notably granulated tobacco, offer numerous obstacles which are not readily foreseen, but which necessitate careful adaptation of the various mechanisms to the end in view. Thus the hygroscopic nature of tobacco causes its condition to vary materially with variations of atmospheric conditions, and its flaky form and oily nature cause it to bridge across hoppers or receptacles, thus greatly interfering with the proper feed and delivery.

All the various working conditions have been carefully noted, considered, and met in the apparatus about to be described, and as a consequence it is found to work very satisfactorily in practice.

In describing the machine the feeding mechanism will be first explained, then the measuring, the weighing, the bag-filling, compressing, and delivering devices, and thereafter the stamping and labeling mechanisms, each with its attendant parts.

*Tobacco-feeding devices.*—To prevent the tobacco from bridging, banking, or otherwise lodging in the supply-hoppers, flexible trunks or hoppers A are employed, the lower end of each of which enters loosely into or stops just above the upper end of a delivery-tube B, through which latter the tobacco is conveyed to the measuring apparatus. The flexible character of the trunk or hopper and its tendency to yield to pressure in any direction cause it to vary its shape as the tobacco passes through or from it, and thus to destroy the support of any bridging body of the material. If deemed necessary, a slight shaking motion, either horizontally or vertically, or both, may be imparted to the trunk or flexible hopper, though the vibration due to running machinery in a factory is commonly sufficient.

In practice it has been found necessary or at least expedient to permit air to enter at the tops of tubes or pipes B, between them and the delivery ends of the hopper-legs A, and this result is best attained by arranging the delivery ends of the hopper-legs to stop just above the tubes B. The tobacco, falling from the hopper, spreads out and forms a cone-like body around the mouth of the tube, and the falling of tobacco within and through the pipe or tube produces a partial vacuum, which induces an inward pressure of air upon the body of tobacco surrounding the mouth of the tube, causing it to enter the same and to descend to the measuring devices. This also occurs when the hopper ends extend slightly into the tubes.

In practice heavy cotton fabric is found to answer quite well for the hoppers, though obviously any other sufficiently strong and flexible material may be used.

The machine is designed to operate somewhat rapidly, and it is therefore found expedient to employ two or more measuring and weighing appliances, a certain length of time being requisite to proper filling of the measures and balancing of the scales, and this time being longer than is required for other operations. In the drawings two sets of such apparatus are shown, but in practice more may be employed, or a single set may be sufficient where speed is unimportant.

The supply-hoppers will ordinarily be located upon one floor of the building in which the apparatus is used, and the measuring, weighing, charging, stamping, and labeling mechanisms will be upon the floor below. Hence conveying-tubes B are provided, as shown in Figs. 1, 1$^a$, 2, 10, 15, and 16, to carry the tobacco or other matter from one floor to the other.

*Measuring apparatus.*—The measuring apparatus is illustrated in Figs. 1, 2, 10, 15, and 16, and comprises in each instance a horizontal disk C, fixed upon a vertical shaft D and adapted to be carried by rotation of said shaft beneath the lower end of one of the delivery pipes or tubes B, which latter are enlarged or elongated in the direction of rotation or travel of the disks, as shown in Figs. 1$^a$, 10, and 15. Each disk is formed with an opening through it of about the size of the interior of the supply pipe or tube B and with a depending neck a surrounding such opening, as shown in Fig. 15. Clamped to the neck $a$ by an encircling band $b$ is a measuring-cylinder E, which, however, may be made fast in any other convenient way, as by a bayonet-lock. Beneath each measure E is a fixed plate or bed F, which is so adjusted that the measure may pass above it but shall travel very close to its upper surface, so that while the measure is over the plate or bed no tobacco can escape from the measure. The tobacco falls somewhat slowly from the supply-tube, and hence there is danger that the measure would not be properly filled if the lower end of the tube were of the same size as the opening in the disk and the tobacco were free to fall only during the passage of one opening beneath the other. It is to guard against this contingency that the lower end of each tube is enlarged in the direction of the travel of the disk, as above mentioned, the opening in the disk being thus kept a longer time beneath the supply-pipe and the measure having abundant time to fill before the two openings pass out of register or alinement. The widening of the delivery end of the pipe or tube also insures the free discharge of the tobacco into the measure. In this way and by providing two or more measuring and weighing devices arranged to act in alternation I am enabled to measure and weigh the tobacco with great accuracy and as rapidly as is demanded by other parts of the apparatus.

As each measure E passes off or from over the plate F its contents fall freely over the edge of the plate into a receptacle below, which in the present instance is a scale-pan G.

The two shafts D are so geared and the two disks C are so set with relation to each other that while one measure is filling the other is emptying, and the same is true of the scale-pans, as will be presently pointed out.

To direct the tobacco from the measures to the scale-pans, each plate or bed F is provided with a chute or inclined plate, extending down into the scale-pan, as shown in Figs. 1, 2, 15, and 16.

The tubes B are made telescopic and the shafts D are screw-threaded, so that the disks may be set higher or lower thereon to permit the use of longer or shorter measures between them and the fixed plates F, according to the size of package desired. Jam-nuts $c$ above and below the disks secure them at any desired height upon the shafts D.

*The weighing apparatus.*—The scale-pans G are preferably of rectangular form, each with a hopper-shaped bottom formed by two hinged doors or gates $d$, each sustained and normally held closed by a spring $e$, a counterweight, or equivalent means, Figs. 1, 2, and 15. Each door or gate has attached to it at or near its pivotal axis an arm or lever $f$, the two arms of each pair of gates being carried inward along the end or side of the pan to a medial point, where they overlap and are connected by a pin $g$ of one arm or lever passing through a slot in the other, so that the two shall move in unison, the pin also serving as a means of connection with a gate-opening lever, as hereinafter explained.

The measuring and the weighing apparatus are both sustained by an upright post or column H, rising from the bed or table I of the main frame of the machine and having lateral brackets or arms to support the shafts D, the weighing apparatus, the plates F, and other parts.

J indicates one of the brackets or supporting-arms, which, as shown in Figs. 1, 2, 10, 15, and 16, carries the weighing apparatus, its outer end being furnished with a cross-arm $i$, having ears $j$, in which are seated the knife-edged pivots or supporting-lugs $k$ of scale-beams K, as best shown in Fig. 15.

Each beam K is bifurcated and has the two arms of the forked portion provided with eyes $l$, in which are seated the knife-edged lugs or pivots $m$ of a scale-pan G.

Each scale-pan G is held normally in an elevated position by an adjustable weight L, applied to the beam at the opposite side of the pivot-axis from that at which the pan is located, the weight being adjusted to counterbalance the pan and the precise quantity or weight of tobacco or other substance required to form the predetermined charge.

The gates of each scale-pan are normally held closed by the springs $e$, which are of strength sufficient to withstand the weight or pressure of any charge that may enter the pan. Their opening is effected by means of a lever M, pivotally supported upon an arm or bracket carried by post or column H and provided at its outer end with a cup or shell $n$, which overhangs the pin $g$ of arm $f$.

The cup $n$ is of such size internally that the pin $g$ may rise and fall within it a limited distance without coming into contact with its walls, this provision being made in order that a slight movement of the scale-pan may take place when its charge is completed without being in any manner affected by the lever M.

To maintain the cup $n$ in proper position relatively to pin $g$ during the filling and weighing operations, a spring $o$ is placed beneath the lower arm of lever M, though obviously the same result may be attained by counterweighting the other arm of the lever.

The rear arm of the lever M is provided with a laterally-projecting stud $p$, which overhangs and rests upon a collar $q$, having at one point on its upper face a lifting-cam or elevation $r$. The cam $r$ is so located with reference to the measuring and weighing mechanisms that it shall pass beneath stud $p$ of lever M shortly after the scale-pan is completely filled, and in thus passing beneath the stud it lifts the rear or inner arm of lever M, depresses its outer end, and causes the cup or shell $n$ to bear upon and depress pin $g$ and thereby to open the gates $d$ of the scale-pan. It is of course to be understood that this mechanism is duplicated, each scale-pan being similarly equipped.

The upward movement of each scale-pan is limited by an extension s of the scale-beam K, which is furnished with an antifriction-roller t to bear against the under side of a collar u on the shaft D. Below the roller t and sufficiently separated from the upper collar to permit the requisite play of the scale-beam is a second collar v, provided on its upper face with a cam or elevation w, so located as to come directly beneath the roller t and to travel under the same at and during the time that the measure E is discharging its contents into the scale-pan. This provision is made in order to prevent the scale pan and beam from being carried down by the momentum of the delivered charge, which is, in fact, slightly under the prescribed weight. This slight deficiency of charge is due to intentional use of a measure very slightly smaller than required to hold a charge of full weight, it having been found necessary to bring the charge up to the prescribed weight by gradually adding the tobacco in minute quantities to the approximate charge first delivered into the scale-pan. This necessity arises primarily from the hygroscopic nature of tobacco and some other substances which the machine may be used to measure and weigh, but is also due in a measure to the varying degrees of comminution of the tobacco or other substance and the consequent greater or less closeness of packing.

To complete the charge and perfectly balance the weight L thereby, I provide for each scale-pan a supplemental feeder in the form of a grooved or fluted cylinder N, Figs. 15 and 16, rotating at the mouth or lower end of a branch or supplemental feed-pipe O, which may communicate directly with the feed-hopper A or with the main feed-pipe B, as in Fig. 1ª.

The precise manner of constructing, mounting, and driving the cylinders N is not important, provided only that they be adapted to go into and out of action at the proper times or that they stop feeding the instant the charge is complete. A convenient plan of construction is, however, illustrated in Fig. 15, in which the cylinders N are represented as made in the form of spools or tubular cylinders, each encircling a fixed axle x, carried by arm or bracket J, and each formed or furnished with a band-pulley y and ratchet-wheel z. Motion is imparted to each cylinder N independently by a belt or band a', passing about the pulley y of the cylinder and about a driving-pulley on a counter-shaft P at the top of the machine.

Belt or band a' is left so loose that, while it will rotate the cylinder N with only the normal resistance of the tobacco to overcome, it will slip upon the pulley y if that resistance be augmented appreciably, and of course when its rotation ceases delivery of tobacco will also cease.

So long as the scale-pan is not completely charged it will remain at its highest point, even after cam or elevation w rides from beneath the extension of the scale-beam; but at the instant that the charge overbalances weight L the scale-pan will descend until the extension s of the scale-beam is stopped by collar v.

Rising from the scale-beam K is a rod Q, Figs. 15 and 16, the upper end of which is passed through a hole or eye in the free end of a gravitating latch or dog R, which is pivoted to a fixed support and is designed to engage with and to lock the ratchet-wheel z of the cylinder N to hold said cylinder against rotation. The rod Q is shouldered, and the shoulder serves to support the free end of latch or dog R and to hold it above and clear of the ratchet-wheel z so long as the scale-pan remains unfilled and elevated; but when the pan is filled and descends the rod Q descends with it, and permits the latch or dog to engage the ratchet-wheel, as in Fig. 16. The cylinder N being thus held against rotation, the belt a' must slip upon pulley y, or other and equivalent friction-drive must be provided, though in practice the slip of the belt is found to answer every purpose.

It will be seen that the construction thus set forth insures quite accurate measurement and more exact weighing of the charge, the actual variation being considerably within the narrow limits prescribed by the Government with reference to tobacco-packages. By removing one pair of measures E E and substituting another, setting the disks C C up or down to correspond, and allowing the telescopic tubes B to shorten or lengthen accordingly the machine may be readily adapted to measure larger or smaller quantities, and by adjusting the weights L the weighing mechanism will be adapted to the measure used.

The shafts D are grooved, and disks C are splined or provided with tongues to enter the grooves to maintain proper relation of the measures E to the gearing and other parts.

It is important that the lower ends of the tubes or pipes B, which, as before noted, are enlarged or made flaring, be held firmly in position and that their weight be prevented from resting upon the disks C C. This end is attained by connecting the lower section of the two tubes B B by a cross-bar S, the central portion of which loosely encircles a screw-threaded standard T, rising from post or column H, and providing said cross-bar with a swiveled nut U, tapped to fit the standard T, this arrangement being illustrated in Fig. 15.

The manner of applying the nut to the cross-bar may obviously be varied, though that indicated is simple and convenient, and by tightening the bolts which hold the plate above nut U said nut may be held against accidental turning.

Rotary motion is imparted to one of the shafts D, and from it to the other through bevel-gearing, as shown in Figs. 1, 2, and 10, though any equivalent driving-gear may be substituted.

It is particularly to be noted that all communication between the supply-pipe and the measure is cut off before the measure begins to discharge, that the delivery end of the measure is close to the scale-pan, and that the supplemental feed-roll N is likewise close to the scale-pan, so that there is no appreciable quantity of tobacco in the air between the delivery devices and the scale-pan at the instant that the latter tips. Hence there is no liability of materially adding to the charge beyond the proper weight.

As shown in Figs. 10 and 15, both scale-pans deliver into a common hopper V, which in turn delivers into the bag-shapes and the bags carried thereon, as will be explained.

*Packing mechanism.*—Rising from the bed or table I of the machine is a tubular post or standard W, in which is supported and guided a vertical shaft or spindle X, carrying at its upper end a horizontal head or disk Y, which in turn supports a series of bag-shapes Z. In practice it is found convenient to employ four such bag-shapes, and that number is shown in the drawings.

Shaft or spindle X is adapted both to turn and to slide vertically in post or standard W, its rising-and-falling movement being effected and controlled by mechanism illustrated in Figs. 3, 4, 5, 6, and 10 and its rotation being produced by mechanism illustrated in Figs. 4 and 9.

Referring to the first-mentioned group of figures, b' indicates a cam carried by a rotatable shaft and acting beneath a shoe c, carried by a block h', having a swivel connection with the lower end of the shaft or spindle X, as shown in Fig. 4. The block h' is preferably made to straddle the cam to lessen the liability of its turning with the shaft or spindle X, a tendency which is further guarded against by extending a guiding pin or stem i' from said block into the slot of a vertical guide-bar j', as shown in Fig. 10. By adjusting the block h' longitudinally or substituting another of different length the time during which the shape-carrier shall be held at its highest point may be determined or varied as desired, and by substituting one of greater depth or measurement vertically the height to which it shall rise and the depth to which it shall fall may be readily determined. This construction greatly simplifies the assembling and adjustment of parts and the proper timing of movements.

As shown in Fig. 6, the spindle or shaft X is longitudinally grooved to receive the feather or spur of a ratchet wheel or plate A', Fig. 9, which has a sleeve passing through the bed or table I, and is held close to the under side of said table by a nut or collar secured to the upper end of the sleeve and resting upon the upper face of the table, as shown in Fig. 4, the spindle being arranged to slide through the ratchet wheel or plate.

Beneath the ratchet wheel or plate A' is an oscillating pawl-carrier B', Figs. 4 and 9, having an outwardly-extending arm, to the upper side of which is pivotally applied a pawl d', which lies in plane with the ratchet wheel or plate A' and serves, when said carrier is moved forward, to engage one of the teeth or abutments e of the plate and to turn the latter forward.

To prevent the plate or ratchet-wheel, and consequently shaft X, with its shape-carrier, from being carried too far under the forward movement of the pawl-carrier and the momentum thus acquired, I provide a second dog or detent f', which is pivotally attached to the under side of table I and is normally pressed inward against the periphery of ratchet-wheel or plate A' by a suitable spring. The outer end of the dog or detent f' is so fashioned that as the pawl-carrier B' completes its rearward stroke the rounded rear end of pawl d' shall engage said outer end of the dog or detent and withdraw the detent from engagement with that one of the faces or abutments g' of plate A' with which it may then be locked, holding it thus out until the next forward stroke of the pawl-carrier carries said face g' beyond the reach of dog or detent f'. The ratchet-plate and shape-carrier are thus made free to advance a step, but are prevented from moving an undue distance by engagement of dog or detent f' with the succeeding face or abutment g'.

The pawl-carrier B' is made to encircle a downwardly-projecting portion of the sleeve of the ratchet-plate A', where it is held by a collar or plate beneath it secured to the sleeve, as in Fig. 4.

An oscillating or to-and-fro motion in a horizontal plane is imparted to pawl-carrier B' by mechanism shown in Figs. 3, 4, 5, and 6, comprising a longitudinally-reciprocating bar C', slotted to encircle and slide upon shaft D' and provided on its side face with two studs or rollers k', between which plays a cam l', carried by shaft D'; a lever E', pivoted to a bracket or hanger depending from bed or table I, and a connecting-rod F', jointed or pivotally connected at its ends with lever E' and with pawl-carrier B', respectively. The connecting-rod F' is made in two parts, threaded right and left, respectively, and united by a sleeve or elongated nut similarly threaded, jam-nuts being provided to prevent accidental loosening or turning of the members. By this construction I am enabled to make accurate adjustment of the throw of the pawl-carrier and to vary its starting and stopping points to accord with other parts of the apparatus.

The bag-shapes Z are rectangular tubes of metal of a cross-section corresponding closely to that of the interior of the bag or holder intended to be filled. Each shape is formed or furnished with a flaring top or funnel and has the outer wall of its lower portion hinged to swing inward, as shown by the left-hand shape in Fig. 2, to facilitate the placing of a bag upon the lower end of the shape, and bent to lap over the adjoining sides, so as to cover the joint when straightened or moved out to normal position to stretch and retain the bag or package.

By the mechanism above described the shape-carrier is caused to rise until one of the shapes is brought directly beneath the hopper V, so that it shall receive the tobacco previously measured, weighed, and discharged into the hopper, the tobacco being prevented from escaping from the shape by the bottom of the bag stretched across its lower end. While one shape is thus brought to receiving position, another is brought to the left-hand side of the table, where an attendant places a bag upon it and straightens the shape to retain the bag. A third shape is at the same time directly over a form or shape wheel, into which each bag is in turn introduced while the charge is being packed and compressed. The fourth shape is at the same time directly over a swinging bunter, by which the empty shape has its hinged wall pressed inward preparatory to receiving a bag.

Figs. 1 and 2 show the shape-carrier in its lower position, and Figs. 3 and 4 show it elevated, as is also done by dotted lines in Fig. 1.

Assuming for explanation that the carrier has been lowered and that the shape Z, at the left hand in Fig. 2, has been acted upon by bunter $m'$, we may follow that shape through its several steps. Cam $b'$ first lifts the shape-carrier and holds it for some time in this position. Pawl-carrier B' next advances and turns the carrier a quarter-revolution or through ninety degrees, shortly after which cam $b'$ lowers the shape-carrier again to the position shown in Fig. 1. During the descent of the shape-carrier a bag is drawn over the shape, which is now in front of the attendant, and the shape is opened out to stretch and fill the bag, or this may be done after the next ascent of the shape-carrier. The carrier now rises, and with the bag in place upon the shape makes another quarter-turn, carrying the shape and bag to a point directly beneath the hopper V in time to receive the tobacco discharged therefrom. The carrier again descends, rises, and turns a quarter-revolution, thereby bringing the charged bag directly over and in alinement with a bag-form $n'$, carried by a form-wheel G', as shown in Fig. 10. When the shape-carrier next descends, the bag and shape enter the form $n'$. A plunger $o'$ is caused to pass down within the shape Z and to compress the tobacco. The shape-carrier then rises, withdrawing the shape from the bag, but leaving the tobacco in the bag and the bag in the form, after which the plunger rises. The next quarter-revolution and descent of the shape-carrier brings the shape in question back to the starting-point.

In order to insure the perfect alinement of the shapes with the several coacting parts, particularly with the form into which the bag is received, the head or disk Y is provided with four vertical holes or openings $c^2$, as shown in Fig. 13, and the table I is furnished with an upright guiding-stem K', Figs. 1, 2, 3, 4, 5, 6, and 7, the upper end of which is made tapering or conical and which serves to guide the head in its descent. The stem is located at a considerable distance from the axis of rotation, and consequently a minute deviation at that point will be unimportant, whereas a like deviation near the center would be quite serious. Each shape in turn is collapsed, provided with a bag, filled, and emptied in the manner set forth, and it is now in order to explain the manner of compressing the charge and withdrawing the shape from the bag.

The form-wheel G' is loosely mounted upon the shaft D' and is independent thereof in time of rotation. It carries on its side face, at or near its circumference, a series of radially-arranged and equally-spaced forms $n'$ of the character indicated in Figs. 11 and 12, wherein a single form is shown in section. As shown, each form consists of three walls, meeting at right angles and constituting three sides of a box, open at both ends, but a fourth side may be provided, if preferred.

The bed or table I is cut away to permit the form-wheel to pass through it and to carry the forms from a position above the table to one beneath it, the bottoms of the forms being held just about on a level with the top of the table when at their highest point.

H', Fig. 10, indicates a false bottom for the forms, consisting of an arm or block projecting from the outer wall of the opening, through which the form-wheel travels inward in position to stand directly under and close to the lower or inner end of each form as it comes in turn to packing position, at which point each form is held at rest during the packing operation and while the bag-shape and the plunger are being withdrawn. This false bottom serves to sustain the bag and its contents while pressure is being applied, but as the forms pass from above it the packages are left free to be forced endwise from the forms by a radially-moving plunger or follower.

It has been shown that shaft D' makes one complete revolution for each elevation, partial rotation, and lowering of the shape-carrier, and that these motions are derived from said shaft through suitable intermediate mechanisms. In like manner each rotation of the shaft advances the form-wheel one step or the distance necessary to remove one form from over the false bottom H' and to bring another to that point. This is accomplished through mechanism illustrated in Figs. 3, 4, 5, 6, and 8, comprising a vertically-swinging lever I', pivoted at one end to a suitably-fixed support in the main frame and carrying at its free end a laterally-swinging pawl or end piece $p'$, adapted to engage with one after another of a series of pins or studs $q'$, projecting from the face of form-wheel $G'$, the pins being equal in number to the forms carried by the wheel.

As shown in Fig. 8, the face of end piece or pawl $p'$ next the wheel $G'$ is so beveled that on the downstroke it shall ride over the pin next back of the one last raised by it and engage with the under or rear side thereof, preparatory to the next upstroke.

The throw of cam $r'$ is sufficient to lift lever $l'$ and to positively advance wheel $G'$ the precise distance required, but as there is considerable weight in the moving parts momentum might carry them too far were no provision made to prevent. I therefore provide a detent $s'$, which engages with the radial wall of one of a series of notches $t'$, formed in the periphery of the form-wheel $G'$, as shown by dotted lines in Fig. 6. Fig. 3 shows the detent thrown outward clear of wheel $G'$, and Fig. 4 shows the nose of the detent drawn and held against the periphery of the wheel by a spring $u'$ ready to drop into the approaching notch, while Figs. 5 and 6 show it seated in a notch.

To withdraw the detent at the proper moment, I provide a rock-shaft $v'$, carrying at one end a radial arm $w'$, which bears against a stud or pin $x'$, projecting from the side face of detent $s'$, and forces said detent outward as the shaft is rocked. The rocking of the arm is effected by a cam $y'$, carried by a shaft $z'$, geared to rotate in union with shaft $D'$, as shown in Fig. 2, and serving, primarily, as means of transmitting rotary motion from shaft $D'$ to upright shaft $D$ at the left-hand side of the machine, said cam acting beneath a bent arm or lever $a^2$, projecting from the rock-shaft, as shown in Fig. 7. The rock-shaft $v'$ is carried axially through a sleeve or tubular bearing $b^2$, which serves also as a pivot for lever $C'$, before mentioned, as will be seen by reference to Fig. 7.

The detent $s'$ is designed to form an absolute stop for the form-wheel, but to prevent undue concussion and strain when the wall of a notch $t$ encounters the detent I apply a friction-pad $J'$ to the periphery of said wheel, as shown in Figs. 1 and 2, said pad being carried by a spring-arm provided with a pressure-adjusting screw, as shown.

*Compressing mechanism.*—After the bag is applied to the shape, moved to the hopper V, supplied with a charge, and carried to and inserted into a form $n'$ of wheel $G'$ it is subjected to the pressure of a plunger $o'$, carried by a cross-head $L'$, sliding vertically in ways or guides in an upright frame or standard $M'$, and moved by a pitman $N'$, connected to the cross-head and to the crank-pin $d^2$ of a gear-wheel $O'$, carried by shaft $D'$, as shown in Figs. 1, 2, 3, 4, and 10. Gear-wheel $O'$ is driven by a pinion $c^2$, carried by the main driving-shaft $P'$, Figs. 10 and 13.

It is desirable that the plunger $o'$ be made adjustable in order that it may act upon different sizes of charge, and that it may produce the exact degree of compression required. Its rod is therefore screw-threaded at its upper end and passed through an eye or opening in a projecting ear or lug of cross-head $L'$, above and below which are located nuts in the form of hand-wheels $Q'$, Figs. 2, 3, 4, 6, and 10. By backing one nut and advancing the other, the plunger may be raised or lowered relatively to the cross-head and its rod firmly clamped in the desired relation. The plunger-head proper is screwed upon its rod, and may be removed and replaced by another of different size whenever a change in size of bag shapes and forms is made. The bag shapes Z and forms $n'$ are likewise made interchangeable. As mentioned, the movements of the parts are so timed that the bag-shape Z withdraws from the bag while the bag is still within the form $n'$ and subject to the pressure of plunger $o'$, which holds the bag and contents while the shape recedes. There is sometimes a tendency of the bag to hang upon the plunger and to be withdrawn by it from the form, involving serious interference with subsequent operations. To preclude this, I provide each form $n'$ with a spring-pressed stud $f^2$, Figs. 10 and 12, the rounded inner end of which, projecting into the form, presses against and retains the package with sufficient firmness to prevent accidental displacement.

*Ejecting mechanism.*—After compression each package is carried by the form-wheel $G'$ through a quarter-revolution of said wheel by two successive steps, and being then in a horizontal position is ready to be ejected. The first step or movement of the bag away from the packing position brings it within easy reach of an attendant, who draws up and ties the strings with which the hem or open mouth of the bag is furnished, and the period of delay after each step is sufficient for the tying of the bag by one attendant and the application of a new bag by another at the left-hand side of the machine, as above mentioned. The second step carries the bag to position to be ejected. The mechanism for performing this operation is illustrated in Figs. 1, 10, 13, and 14. As best shown in the last-mentioned figure, it consists of a plunger or follower $g^2$ at the end of a rod carried by a cross-head $h^2$, sliding upon horizontal guide-rods $i^2$, secured to the framework of the machine, a pendulous lever $j^2$, an upwardly-extending lever $k^2$, a link $l^2$, connecting said levers, a rod $m^2$, connecting the free end of lever $k^2$ with cross-head $h^2$, a cam $n^2$, carried by shaft $D'$ to move the lever $j^2$ and the connected parts forward, and a spring $o^2$ to return them.

The forms $n'$, carried by wheel $G'$, while not having four complete walls nevertheless have a partial fourth wall or a wall with a longitudinal opening radial to the axis of the wheel $G'$, as best shown in Fig. 10. The opening is designed to permit the passage of a lateral projection of cross-head $h^2$, to which is attached the stem or rod of follower $g^2$, but this will not be necessary in all cases.

The machine thus far described will serve to measure, weigh, pack, and compress tobacco and other substances, but as tobacco-packages require to be provided with an internal-revenue stamp and with a so-called "district label" giving information as to the place of preparation, &c., and as a manufacturers' label is almost invariably used as well, it is preferred to combine with the foregoing a stamp and label attaching mechanism, the two being so designed and related that they shall act in unison or in harmony and as one complete organization driven by the same power. At the same time it is convenient to provide means of ready connection and disconnection of the two, so that one may be used without the other.

*Stamping and labeling mechanism.*—The stamping and labeling apparatus will be explained in connection with Figs. 17 to 53, inclusive, its relation to the packing apparatus being shown in Figs. 1, 2, and 13. In the latter figure the follower $g^2$ is represented as moved forward to the limit of its travel, or nearly so, and as having ejected the package $p^2$ from the form $n'$ and delivered it upon a track or way $q^2$. Fig. 17 shows the relation of the bag-form $n'$ and the track or way $q^2$.

Fig. 19 shows the track or way with the package upon it, the view being a vertical section in a plane transverse to the length of the track or way and at a point between the periphery of wheel G' and the end of said track, there being a slight separation between the two.

Directly below the gap or space between the form-wheel G' and the track or way $q^2$ there is vertically disposed a stamp-holder Q', adapted to contain a supply of revenue stamps of the required denomination or value. Directly above and in line with the stamp-holder is a vertically-reciprocating gripper R', which serves to grasp the protruding end of a stamp to draw the stamp lengthwise from the holder over or in contact with a paste-roller S' and to hold the stamp suspended by its upper end directly across the path of the bag or package as the latter passes from the form $n'$ to the track or way $q^2$.

In Fig. 18 the gripper is shown in the act of seizing a stamp preparatory to withdrawing it from the holder, while Fig. 19 shows the bag or package in the act of being forced with the stamp between rolls $q^3$, by which the stamp is pressed down smoothly upon the bag.

Passing for a moment from the gripper and its actuating mechanism and referring to Figs. 45 to 49, the construction of the stamp-holder will be described. The figures mentioned illustrate the district-label holder, but as the construction of the two is essentially the same, except that the stamp-holder is arranged vertically and the label-holder is horizontally arranged, the same description will answer for both.

As shown in Fig. 49, the holder consists of a box or receptacle of rectangular form and of proper internal dimensions to freely receive the stamps or labels, as the case may be. One side wall $r^2$ is hinged to the body of the holder and adapted to swing away therefrom to permit insertion or removal of the stamps or labels, which are pressed by a follower $s^2$ against overhanging lips or flanges $t^2$ at the open side of the holder. The hinged wall $r^2$ is retained in its normal or closed position by a suitable catch or fastening $u^2$.

The stamps or labels are delivered lengthwise from their holders, and for this reason the lips or flanges $t^2$ are set away from the end wall of the holder at the delivery end, as shown in Figs. 48 and 49, leaving free space for escape of one stamp or label at a time.

The follower $s^2$ is provided with a guiding-stem, which has a long bearing in a guiding-sleeve, so that its movements may be true and free from cramping or binding. Pressure of the follower against the stamps or labels is secured through the use of a band or cord $v^3$, attached to the guiding-stem of the follower, carried about suitable pulleys, and furnished with a weight. Obviously a spring or springs may be used instead, but the weight gives uniform pressure and is quite satisfactory.

Where two stamps or labels lie face to face and subject to pressure, it is very difficult to withdraw one without the other, and where a number are thus pressed together several are liable to come at once. To prevent this and insure the withdrawal of but one at a time, I provide a spur or tooth U', of the form shown in Figs. 45 to 48, inclusive. This consists of a thin steel blade having its lower end cut obliquely and brought to a thin knife-edge, thus producing a sharp point, which will pierce two or three stamps or labels ordinarily as they are pressed against it by the follower. The longitudinal edge of the blade is left flat or undressed to a height a little above the point to which the blade penetrates the stamps or labels, and then is cut out on a curved line and brought to a knife-edge, as clearly shown in the drawings. The spur or tooth thus formed is clamped in the position indicted in Fig. 45, the body of the blade inclining somewhat in the direction in which the label or stamp is to be withdrawn.

The action of the device is illustrated in Figs. 46 and 47. The initial movement of the stamp or label is produced by a claw or roughened foot $x^2$, which presses against the outermost stamp or label with just sufficient force to slide it upon the one next to it. This longitudinal movement causes the outer stamp or label to move lengthwise and the rear end thereof to ride upward on the flat face or edge of the blade until it reaches the sharpened or knife-edged portion above the flat or blunt lower end, whereupon it is slit or cut to the end, and thus made free to be drawn from the box or holder. The next stamp or label, being less forcibly drawn, is merely held back by the flat face or edge of blade U' and remains at rest.

As stated, the same construction is employed for the two holders, which contain, respectively, the revenue-stamps and the district labels.

For withdrawing the stamps or labels from their holders there is provided, first, a claw to start the strip and to cause it to protrude sufficiently to be engaged by the gripper; and, secondly, a gripper having a longitudinal movement sufficient to carry the stamp or label to such position as will insure the package being pressed against it. In essential particulars these devices are the same for the revenue-stamps and for the district labels, and hence one description will answer for both. This will be given in connection with Figs. 18 to 27, inclusive.

As seen in Fig. 19, a series of arms or brackets extends inward from the sides of the main frame of the machine toward the center to support and carry the various working parts, the stamp-holder, the paste-receptacle, the pressing-rolls, the gripper, &c. V' indicates a vertical guide-bar encircled by a hollow block or sliding head W', to which is secured a fixed gripper-jaw $z^2$ and in which is journaled or supported the rock-shaft $a^3$ of a movable gripper-jaw $b^3$. The rock-shaft $a^3$ of the movable gripper is furnished with a short radial arm $e^3$, which extends through an opening in the block or head W' and enters an opening in a vertical lifter-bar X', the upper end of which latter is pin-jointed to a lifting-lever Y', pivoted to the frame of the machine and furnished with an antifriction-roller, which rests upon a cam Z', whereby the bar X' and its attached parts are raised and lowered. The pin or stud $d^3$, (shown in Figs. 21, 22, and 24,) by which connection is made between bar X' and lever Y' and by which said bar is lifted, passes through a short slot $e^3$ in the block or sliding head W', as seen in Fig. 24, which arrangement permits a slight movement of the bar or the block, one in relation to the other. If the movement of the bar be upward or the movement of the block be downward, relatively, the jaw $b^3$ of the gripper will be caused to close against the fixed jaw $z^2$; but if the relative movement be the reverse of that stated the movable jaw will be thrown away from the fixed jaw.

Near the lower end of the guide-bar V' is a second hollow block or sliding head A², similar to the upper head or block W' and like it carrying a rock-shaft $f^3$, with a short radial arm $g^3$, extending into a slot or opening $h^3$ in lifter-bar X', which slot, however, extends nearly the whole length of the bar, as shown in Fig. 23. The outer end of rock-shaft $f^3$ carries the roughened foot or claw $x^2$, before referred to as serving to start the outermost stamp or label from the box or holder. The block A² is provided with an internal recess to receive a friction-spring $i^3$, Fig. 23, by which the block is caused to stand at any point upon bar V' to which it may be moved. Slot or opening $h^3$ of lifter-bar X' is of such a length that its lower end wall encounters arm $g^3$ only near the termination of the upward travel of said bar X', at which time the stamp has been carried clear of or above the claw or foot $x^2$. The lower end wall of opening $h^3$, striking the arm $g^3$ at his instant, throws the claw or foot $x^2$ against the next stamp and during the slight further movement of the bar X' draws the stamp a short distance out of its holder, as in Figs. 23, 25, and 45, where it may be readily seized by the gripper when the latter again descends.

Bolted or otherwise made fast to the block W' and projecting therefrom to a point directly over the track or way $q^2$ is an arm $j^3$, Figs. 1, 2, 17, 18, and 19, in which is adjustably secured the vertical stem of a follower or presser $k^3$, which as the block W' descends bears upon the package $p^2$ and serves to depress the same, as hereinafter explained. The resistance offered by the package to the descent of the follower $k^3$, which is of course transmitted to head or block W', causes said block to be held back relatively to bar X', and hence the movable jaw $b^3$ is opened away from fixed jaw $z^2$ as the parts descend.

Obviously the block or head W' may be furnished with a friction-spring $i^3$, similar to that of block A² in Fig. 20, and thus made wholly independent of the package and of follower $k^3$ as to its action, or any other retarding device or stop may hold back the block W', while bar X' continues to move sufficiently to open the gripper.

It will be seen that as the claw $x^2$ starts a stamp or label out of the box and leaves it protruding a short distance just as the up-stroke is completed and as the gripper opens in descending the jaws of the gripper will pass down on opposite sides of the stamp or label as the gripper completes its descent. As the bar X' is again elevated through the action of lever Y' block or head W' will naturally remain at rest until the pin $d^3$ reaches the upper end wall of the slot in said block, thus acting upon arm $e^3$, turning the rock-shaft $a^3$, and throwing jaw $b^3$ firmly against jaw $z^2$ or against the stamp or label between it and the fixed jaw. In this way the stamp or label is firmly clamped before the block W' begins its movement, and immediately thereafter the block begins to move with the bar X' and to carry the stamp or label with it.

It is necessary to apply paste to the back of the stamp or label, if ungummed, or to apply moisture thereto, if gummed, and I therefore provide a pendulous box B², Figs. 2 and 27, which is conveniently hung to the support which carries the track or way $q^2$ and is made to curve downward toward a roller S', which serves to supply paste or water, as the case may be, from the box to the stamp or label. The roller S' is carried by an axle $l^5$, which is extended beyond the sides of the box, as shown in Fig. 27. To one end of the axle $l^5$ is attached a light spiral spring $m^3$, which tends to draw the roller and the lower end of the paste box or receptacle $B^2$ over toward the outermost stamp or label of the holder Q'.

It is desirable that the paste-roller S' be retracted or taken out of the path of the gripper as the latter approaches the protruding end of the stamp or label and that it be held away from the stamp or label at all times except during the withdrawal thereof from the holder, as otherwise the paste would be deposited and dry upon them. I therefore attach to the upper block or head W' a vertical bar or rod $D^2$, bearing near its upper end an adjustable offset-block $n^3$ and bearing near its power end an offset-block $o^3$, both beveled to ride in front of and to force back an extension $l^6$ of the paste-roller axle $l^5$ or other projection, which will cause the paste-receptacle and its roller to swing back away from the stamp. As the gripper descends to seize the stamp or label the inclined face of block $n^3$, and, later, its flat face, passes in front of the extension $l^6$ and moves the roller $C^2$ away from the stamp and out of the way of the gripper; but as the block W' and bar $D^2$ immediately thereafter begin an upward movement the block $n^3$ is withdrawn and roller S' is drawn by spring $m^3$ into contact with the stamp or label and retained there during the upward movement of the stamp, the pressure and movement of the stamp serving to rotate the roller and thus to draw a proper supply of paste (or moisture) from the box. As the bar X' nears the limit of its upstroke block $o^3$ rides in front of extension $l^6$ and forces the paste box and roller back. Immediately thereafter the lower end wall of the slot in bar X' encounters arm $g^3$ of the rock-shaft $f^3$, as in Fig. 25, throwing the claw $x^2$ against the stamp or label and thereafter lifting the block $A^2$ bodily. The paste box and roller are already thrown back by block $o^3$, as just explained, and as block or head $A^2$ rises an adjustable stop-plate $p^3$, carried by it, passes upward in front of extension $l^6$ and locks the same away from the pasting position. Block or head $A^2$ being held in its elevated position by spring $i^3$, it will be apparent that the head W' and bar $D^2$ may freely descend without liability of the paste box or roller swinging forward until the upper end wall of the slot $h^3$ in bar X' encounters arm $g^3$ of the claw mechanism, throws back the claw $x^2$, and, continuing downward, carries block or head $A^2$ with it, thereby withdrawing stop-plate $p^3$ and leaving the paste box and roller free to move forward as soon as block $n^3$, which now comes into play, shall have been withdrawn again. The parts are so timed that as the stamp or label reaches its highest point and hangs suspended from the gripper the package $p^2$ is ejected from form $n'$ directly against the stamp or label, carrying the latter before it between the pressing-rolls $q^3$. It is of course necessary that the stamp or label be released by the gripper as soon as the package presses fairly against it, as otherwise it would be either torn or displaced. I therefore provide the block or head W' with an incline $r^3$, and I provide a pendulous lever $E^2$, which carries a roller $s^3$, to ride beneath the incline and to lift the block or head W', while bar X' remains at rest. This relative movement, as before explained, causes jaw $b^3$ to open away from jaw $z^2$, and thus the stamp or label is released at the proper moment.

Motion is imparted to lever $E^2$ by a draw-bar $F^2$, which carries a roller $t^3$ to roll upon a cam $u^3$, carried by the same shaft $L^2$ which carries the cam Z'. Hence the relative motions of the parts are perfectly timed and maintained. The draw-bar passes about said shaft and is guided thereby, a spring $v^3$ serving to hold the roller $t^3$ always in contact with the periphery of the cam $u^3$.

The operations of applying the stamp or label are well illustrated in Figs. 23 and 26.

In the foregoing description I have used the term "stamp" and "label" interchangeably, for the reason that although in practice the holder Q' is supplied with revenue-stamps it may be used equally well for labels, and often will be where stamps are not required.

*District-label mechanism.*—For the purpose of applying the so-called "district label" I employ a label-holder $G^2$ in all essential particulars the same as holder Q', but arranged in horizontal instead of vertical position, as shown in Figs. 17, 28, 29, 30, 31, and a gripper similar in construction and action to the gripper above described for seizing and withdrawing the revenue-stamp.

Referring first to Fig. 17, $H^2$ indicates a fixed guide-bar extending horizontally across the frame of the machine from side to side, $I^3$ a block or claw-carrier fitted to slide thereon just above the delivery end of the label-holder $G^2$, and $J^3$ a similar block or carrier fitted to slide upon the bar $H^2$ and provided with a fixed jaw $w^3$ and movable jaw $x^3$, jointly constituting a gripper. $K^2$ indicates a bar which is guided and movable in both the blocks or carriers $I^2$ and $J^2$ and which is cut out or notched, as shown by dotted lines in Figs. 30 and 31. The movable gripper-jaw $x^3$ is carried by a rock-shaft $y^3$, journaled in the block or carrier $I^2$ and provided with a radial arm $z^3$, which, entering a short notch in the bar $K^2$, forms a connection between the bar and the block or carriage, permitting a slight movement of one in relation to the other sufficient to rock shaft $y^3$ and to throw gripper-jaw $x^3$ toward or away from jaw $w^3$. Block or carrier $I^2$ is similarly furnished with a rock-shaft $a^4$, carrying a claw or serrated foot $b^4$ and provided with a radial arm $g^4$, which is encountered alternately by the end walls $e^4$ and $f^4$ of an elongated notch or recess formed in the upper edge of the bar $K^2$, as seen in Figs. 29, 30, and 31. Bar $K^2$ is longitudinally reciprocated at proper intervals by a system of levers $M^2 N^2$ and connecting-links $O^2 P^2$, actuated by a cam $Q^2$, carried by shaft $L^2$, and bearing against a stud or roller $c^4$ of lever $N^2$, Figs. 28, 29, 30, and 31, the link $O^2$ being adjustable as to length, as shown in Figs. 30 and 31. When the lever $M^2$ moves toward the label-holder $G^2$, bar $K^2$ first acts upon arm $z^3$ of the rock-shaft of the gripper and lifts the movable jaw away from the fixed jaw, and immediately thereafter begins to move the block or carriage $H^2$. When wall $e^4$ of bar $K^2$ encounters the radial arm of rock-shaft $a^4$ of the claw or foot $b^4$, it rocks said shaft so as to lift the claw or foot from the labels and moves block $I^2$ and its claw backward. The gripper then overlaps the protruding end of the label, and as bar $K^2$ starts back closes upon and grasps the label, withdrawing it from the box or holder. When wall $f^4$ of bar $K^2$ strikes arm $g^4$ of the claw-carrying rock-shaft, it first throws down the claw and then moves block $I^2$ and claw $b^4$ far enough to start the next label outward ready for the grippers.

$R^2$ indicates a paste-receptacle which is carried by a suitable bracket or supporting-arm $S^2$, attached to the main frame of the machine and made adjustable by slots and clamping-bolts or otherwise. At the bottom of the receptacle $R^2$ is a roller $d^4$, the upper side of which extends into the bottom of the receptacle, while the lower side projects below and serves to apply paste to a label drawn beneath it.

If paste were applied to the forward end of the label, the grippers would soon become fouled, and the labels would adhere thereto, so that they would be torn, and the machine would become clogged. I therefore lift the paste-receptacle sufficiently to clear the label during the movement of the block or carrier $I^2$ and its claw $b^4$ outward, or in direction to start the label from the holder. In this way the outer end of the label, which is grasped by the grippers, is left clean and free from paste.

The paste-receptacle is free to rise and fall a limited distance and is raised at the time indicated by a lifter $h^4$, carried by the block or carrier $I^2$, or by a bar $U^2$, attached to carrier $J^2$, and so located as to pass beneath an antifriction-roller or a lug or projection of the paste-receptacle just at the time that bar $K^2$ completes its movement away from the label-holder and when the block or carrier $I^2$ is moving outward with the new label. It will be seen that as the bar $K^2$ again moves toward the label-holder the paste-roller $d^4$ is lowered upon the label, which has been previously started, and remains thereon during its entire outward movement, being lifted immediately thereafter and while the new label is being started forward.

Figure 28:
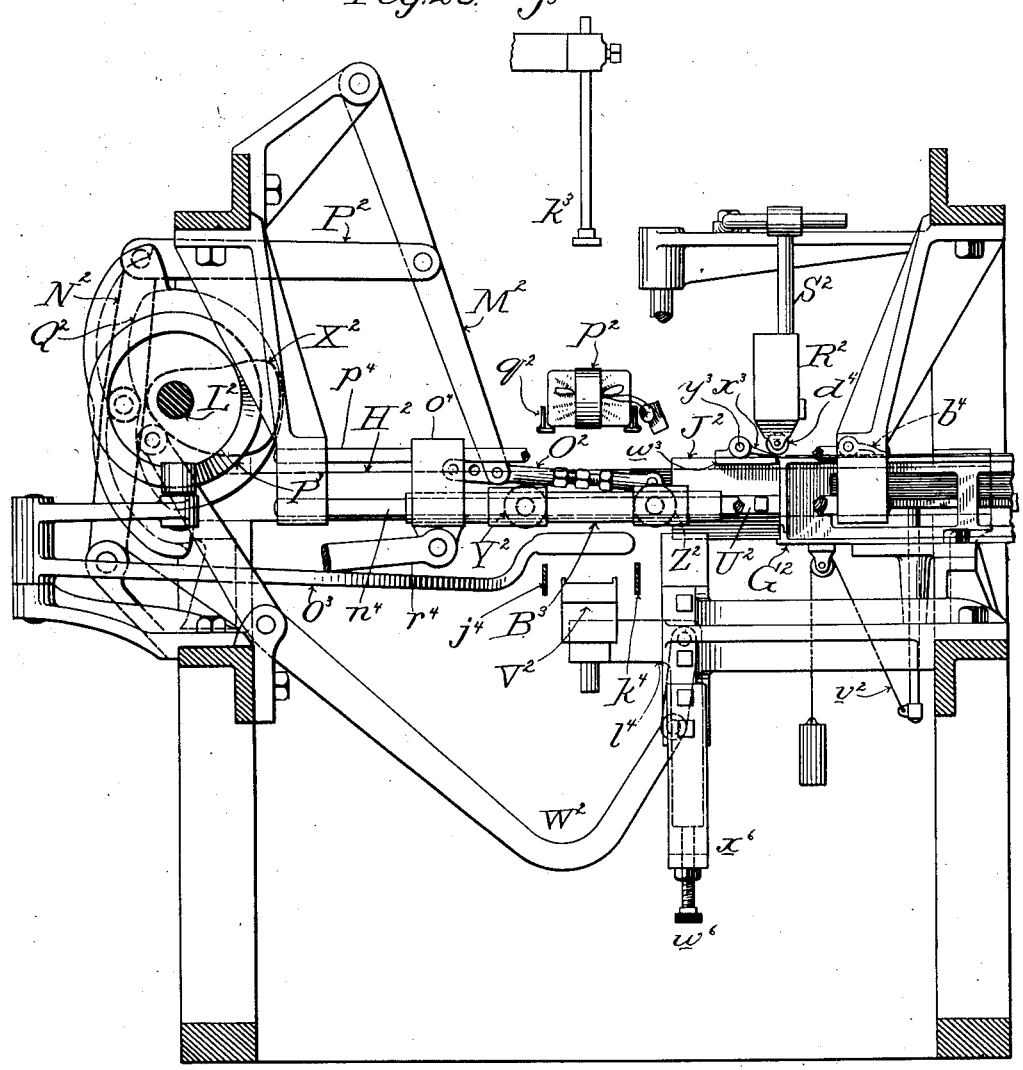

As shown in Fig. 28, the label-holder $G^2$ is on a lower level than the track or way $q^2$, and for the purpose of permitting the package to descend to receive the label and to effect its proper application the supporting-ledges of the ways are hinged, as in Fig. 29 and as indicated by dotted lines in Fig. 30, at that point in their length where the package is to descend. The hinged sections of the ways are normally upheld by springs $i^4$, of sufficient strength to sustain them against the weight of any package that will come upon them, but light enough to be readily overcome by the pressure of plunger $k^3$, which is located directly over this portion of the track or ways $q^2$. When the plunger $k^3$ descends, which it does simultaneously with the stamp-gripper, being carried by the block or carrier $W'$, as above explained, it presses the package before it and carries said package against and holds it upon a package-support $V^2$, which is raised and lowered in proper time by a lever $W^2$, actuated by a cam $X^2$ on shaft $L^2$. The package is thus prevented from falling too far or too suddenly and from turning or shifting its position relatively to the labeling mechanism.

The package-support $V^2$ is of the form best shown in Fig. 29, which figure also clearly shows the relation of coacting parts, the package-support being represented as raised to the level of the track or way $q^2$ ready to receive the package. At a point between its ends the support $V^2$ is cut out or depressed, leaving a space between the package-sustaining portions through which the label may extend without being disturbed by the rise of the package-support, the label being drawn from the holder and laid across the path of the support before the latter rises. The support $V^2$ is carried by a right-angled member $l^4$, the vertical portion of which is guided in a bracket or casting of the main frame, as shown in Fig. 17, and is connected by a link with the lifting-lever $W^2$.

$Y^2$ and $Z^2$ indicate two rollers, which during the withdrawal of the label from the holder occupy the positions in which they are depicted in Figs. 29, 30, and 31, directly below and with their inner or opposing faces on line with the ways $q^2$. Hence as the label is drawn from its holder it will be laid across said rollers, as in Fig. 30.

When the package-support rises, as it does just after the label is laid across the rollers $Y^2 Z^2$, its carrying-faces pass upward on each side of the label, leaving the label extending through the central depression of the support $V^2$, as shown in Fig. 30, with its paste-covered side uppermost. The plunger $k^3$ and support $V^2$ now descending, the package is brought into contact with the label, which is then forced downward between the rolls $Y^2 Z^2$, which, pressing closely against the sides of the package, apply the label smoothly and firmly thereto, drawing it tightly across the lower face as well as the sides. The support $V^2$ descends until it reaches the level of a platform $A^3$, having raised side walls $j^4$ $k^4$ and extending in the same direction as track or way $q^2$. At this level the support holds the package with its upper face just about on a level with the under sides of the rollers $Y^2$ $Z^2$ or a little above said plane.

It will be seen by referring to Fig. 31 that the depression of the package and its passage between the rolls cause the end of the label to be withdrawn from the gripper and the two ends to stand in vertical planes above the package. To fold them down upon the package, the rollers are caused to move inward over the package successively. This movement of the rollers may be effected in various ways, two of which are illustrated in the drawings.

Referring first to Figs. 29 to 34, inclusive, $B^3$ indicates a tubular shell or sleeve upon which are clamped at any desired adjustment and distance apart two stems $m^4$, upon the ends of which are mounted the rollers $Y^2$ $Z^2$. The sleeve $B^3$ encircles a guide-rod $n^4$ and is provided with a cross-head $o^4$, which encircles a second guide-rod $p^4$, parallel with the first, the cross-head and rod $p^4$ serving to prevent the sleeve from turning about its axis. A longitudinal reciprocation is imparted to the sleeve $B^3$ by means of a pendulous lever $C^3$, provided with an antifriction-roller or a stud $q^4$, which is acted upon by a cam $D^3$, the lever being connected with cross-head $o^4$ by a link $r^4$. Cam $D^3$ is so fashioned as to cause a movement of sleeve $B^3$ forward, backward, and again forward to first position, the first two movements being sufficient to carry first one and then the other roll across the package and the last movement serving to restore them to their normal or first positions. Fig. 32 shows the rolls in first position. Fig. 33 illustrates their first movement, and Fig. 34 illustrates the second, while the third brings them again to the position shown in Fig. 32.

Referring now to Figs. 35, 36, and 37, a somewhat different and preferred construction will be explained, whereby the rolls move independently and one at a time. $E^3$ indicates a guide-bar supported at its ends in the framework of the machine and upon which are mounted two sliding roll-carriers $F^3$ and $G^3$. Each carrier is normally drawn away from the other by a spiral spring $s^4$, so that normally they occupy the positions indicated in Fig. 35, the rolls $Y^2$ and $Z^2$ being then in position to press the label to the sides of the descending package. The roll-carriers are provided, respectively, with projecting studs or bolts $t^4$ and $u^4$, which extend into or through slots $v^4$ in a bar $H^3$, one end of which is connected to link $r^4$. When the parts are in normal position, the studs or bolts $t^4$ and $u^4$ are at the outer ends of the slots of bar $H^3$, as shown in Fig. 35, and the end walls of the slots may constitute stops to determine the outward movement of the roll-carriers. I prefer, however, to provide adjustable stops $w^4$ for this purpose, as shown. Under this construction and arrangement of parts a forward movement of lever $C^3$ will carry roll $Y^2$ inward and across, or partly across, the package, as in Fig. 36, roll-carrier $G^3$ and its roll $Z^2$ remaining at rest, because the slot into which its stud $u^4$ extends moves freely over the pin. As lever $C^3$ recedes carrier $F^3$ is returned against its stop $w^4$ by spring $s^4$, and as the bar $H^3$ is carried still farther back by lever $C^3$ the outer end wall of its slot encounters stud $u^4$ of roll-carrier $G^3$ and moves said roller inward across the package, as in Fig. 37. A short return movement of bar $H^3$ permits roll-carrier $G^3$ to be returned by spring $s^4$ to its first or normal position.

The last-described construction is preferred for the reason that there is no liability of one roll destroying or impairing the work of the other, as may sometimes occur under the first-described construction.

It has been found in actual work that if plain cylindrical rolls be used air is apt to be confined beneath the label and to produce blisters, which detract from the appearance and the security of the labels. To remedy this fault and insure perfect adherence of the labels, I groove or corrugate the rollers $Y^2$ $Z^2$ circumferentially, as shown in Figs. 17 and 29, and the same may be done with the stamp-rollers $q^3$ if deemed advisable.

With certain classes of packages it is customary or often desirable to supply cards, books of cigarette-papers, or the like. To permit this to be done automatically, I provide the machine with an upright magazine or holder $I^3$, Figs. 1, 2, 17, 39, 40, and 44, consisting, preferably, of four upright posts of sheet metal bent into L form in cross-section and so spaced as to receive and guide the cards or books when superposed one upon another therein, as in Figs. 39 and 40.

As shown in Figs. 28 to 37, inclusive, the upper face of the package-support $V^2$ is recessed to a depth sufficient to receive a card or book of cigarette-papers between the ribs $t^6$ thus formed along its sides, said ribs serving to receive and to support the package, but leaving a space beneath it sufficient to receive the card or book of papers. The lower end of the magazine rests upon two parallel bars $u^6$, which are recessed or cut away on their upper faces to a depth equal to the thickness of the cards or books to be introduced into the magazine and delivered therefrom, as will be readily understood upon referring to Figs. 38 to 41. Extending across the space between the two bars $u^6$ and fitting the recesses thereof is an ejector-plate $J^3$, the upper surface of which, coming just flush with the top faces of the bars $u^6$, is free to pass beneath the horizontal lower edge of the crossbeam or bar $K^3$, Figs. 39 and 40, by which the magazine and the bars $u^6$ are carried. Ejector-plate $J^3$ is retained upon the bars $u^6$ by plates overlapping its edges and secured to the bars $u^6$ or in any similar manner and is longitudinally reciprocated at suitable intervals by a lever L³, connected to the plate by a link r⁶ and moved in one direction by a cam M³ on shaft L² and in the opposite direction by a spring N³.

As shown in Figs. 2 and 17, the bars u⁶ are in the same horizontal plane as the track or ways q² and in line therewith. The cam M³ is so set and shaped as to permit spring N³ to project the plate or slide J³ beneath the magazine just at the time that the package-support V² is in plane with said way and bars.

The throw of the ejector-plate is such as to carry the bottom card or book from the magazine to the support V² and to deliver it thereon across the depressed portion, so that as the support V² descends with the bag or package the card or book of cigarette-papers will be carried against the district label lying across the rollers Y² Z². The label will thus bind the inserted card or book of papers to the bag or package p², and the label will be so tightly drawn about the bag that there will be no liability of the inserted card or book falling out in handling the bag or package.

The machine will operate whether the magazine be charged or empty, and hence it is entirely optional with the user of the machine to insert the cards or books or to omit them, or the spring N³ may be disconnected to prevent delivery.

It has been mentioned that the package-support V² descends to a level with a platform A³, having upright walls or guards j⁴ k⁴. (Best shown in Fig. 29.) To nicely determine and control the descent of the support V², a stop-screw w⁶ is screwed through the closed end of the casting x⁶, in which the member l⁴ is guided, as shown in Fig. 28.

When the district-label is applied and duly rolled down upon the bag or package, it becomes necessary to remove the bag, and thus to prepare the parts to act upon another. If no further label is to be applied, the bag or package may be ejected from the machine; but if further work of the sort is desired it may be simply transferred to the mechanism for doing such work. In either case the package is swept from the support V² to the platform A³ and carried along said platform until half its length or more projects beyond the end of upright wall or guard k⁴, at which point the platform extends at right angles to the walls or guards j⁴ k⁴, as shown in Figs. 42 and 43. This movement of the bag or package is effected by a lever O³, (shown in Figs. 17, 28, 29, and 42,) moved in one direction by a cam P³ on shaft L² and in the other by a spring Q³, the effective stroke being in this instance produced by the cam and the return stroke by the spring. This is the reverse of the arrangement of cam and spring used at various other places in the machine, where the effective stroke is made dependent upon the action of the spring in order that there may be no straining or breakage of parts in the event of clogging. In such case the spring simply yields, and the parts controlled by it fail to act until the stoppage is removed.

*Mechanism for applying manufacturer's or dealer's label.*—R³ indicates a label-holder designed to hold large rectangular labels to cover the major portion of one face of the bag or package. The construction of this holder is illustrated in Figs. 50 to 53, inclusive, and may best be explained before describing the mechanism for delivering the bag or package beneath it. As shown, the holder consists, essentially, of a rectangular box open at top and bottom, but provided with inwardly-extending lips or flanges y⁴ at the ends to sustain the ends of the labels. One side wall of the box is made removable, being formed with slots to receive clamping-screws, which, being backed or eased slightly, permit removal of the side plate for insertion of labels or for other purpose. The inner walls of the holder are recessed, so that the labels are guided only at the corners and may the more readily descend. Rising from a wall of the holder R³ is an arm S³, which overhangs the top of the holder and serves as a support and guide for a follower T³. As shown in Fig. 51, the stem z⁴ of the follower passes through a sleeve or tube a⁵, secured in a cross-bar b⁵, the ends of which are fashioned into cylindrical studs c⁵, which enter vertical guiding-slots d⁵ in the walls of the holder R³. The sleeve a⁵ passes through arm S³ and through a spiral spring U³, seated therein, and is provided at its upper end with a nut or collar E⁵, which rests upon the spring, and thus gives a yielding or elastic support to the sleeve a⁵ and cross-bar b⁵. As shown in Figs. 50 to 53, inclusive, stem z⁴ is provided with ratchet-teeth having abrupt upper faces, and a weighted locking-dog f⁵, pivoted in ears on the cross-bar b⁵, is arranged to engage with one after another of the ratchet-teeth as the follower descends to press upon the diminishing stack of labels, thus preventing the rise of the follower from the labels and holding them at all times closely down upon the ribs or flanges y⁴.

When the holder is to be charged, the locking-dog is disengaged from the ratchet-bar and the follower is lifted until a notch g⁵ in its stem comes into alinement with a locking-lever h⁵, pivotally attached to nut or collar e⁵, whereupon the lever is thrown into the notch, as in Fig. 50. When the holder is charged, the lever h⁵ is withdrawn and the follower T³ is permitted to rest directly upon the labels.

The holder R³ is formed with an eye or box-like projection i⁵ at one side, as shown by dotted lines in Fig. 50, to encircle or fit about a vertical guide in the frame of the machine. The holder is suspended from the horizontal bifurcated end of the lever V³, pivoted to the main frame of the machine, which lever has an upright arm j⁵, provided with a series of holes for attachment and adjustment of one end of an actuating rod or pitman W³, the other end of which is fashioned into a yoke to encircle and to slide upon shaft $L^2$, as seen in Fig. 44. At each end of the slot in the yoke of rod or pitman $W^3$ there is an antifriction-roller, and between these rollers plays an actuating-cam $X^3$, by which reciprocating motion is imparted to the rod or pitman. The bifurcated arm of lever $V^3$ extends beneath studs $s^5$, projecting inward from the walls of the holder $R^3$, and also projects over the crossbar $b^5$, which latter is normally held up by spring $U^3$, so that the studs $c^5$ are at the upper ends of the slots $d^5$.

Reverting now to Figs. 42 and 43, $Y^3$ indicates a guide-bar, and $Z^3$ a slide encircling and arranged to move lengthwise of said bar. Pivotally supported upon said slide is a vertical lever $A^4$, having a horizontal arm from which projects a bunter $k^5$ and an arm or plate $l^5$, which latter bears upon the upper end of a spiral spring $m^5$, encircling a guiding-stem, as shown in Figs. 42 and 43. The spring serves to hold the lever $A^4$ in an upright position and to maintain the bunter $k^5$ in a horizontal position normally, though permitting the lever to rock and the forward or outer end of the bunter to fall under certain circumstances. The slide $Z^3$ is moved back and forth along the bar $Y^3$ by the lever and link mechanism $B^4 C^4 D^4 E^4$, Fig. 42, lever $B^4$ being moved in one direction by cam $F^4$ on shaft $L^2$. The parts are moved in the forward direction by a spring $G^4$, Fig. 44. Between the slide $Z^3$ and the label-holder $R^3$ is located a paste-box $H^4$, which is suspended from the bar $K^3$ or other suitable support. When in its normal position, as indicated in Fig. 44, the upper edge of the paste-box nearest the middle of the machine bears against a stop, being drawn thereto by a spring $n^5$, but it is free to move away from said stop toward label-holder $R^3$ upon the application of force sufficient to overcome spring $n^5$ and its own weight. The parts being thus constructed and the bag or package $p^2$ being brought by lever $O^3$ to the position indicated in Fig. 42, a forward movement of slide $Z^3$ causes the bunter $k^5$ to encounter the forward or outer end of the bag or package and to turn the same upon the platform $A^3$ a quarter-turn, or to a position at a right angle to that it previously held. This operation is illustrated in Fig. 43.

The outer end of guard $k^4$, which is slightly rounded, forms an abutment or bearing for the bag in turning, and the bunter $k^5$ prevents the bag from moving unduly outward, holding or pressing it closely against the inner one of two guards or ribs $o^5 p^5$, with which table or platform $A^3$ is furnished. As the slide $Z^3$ continues forward the horizontal arm of lever $A^4$, to which the bunter $k^5$ is attached, comes against the end of the bag and pushes it forward to a point directly beneath the label-holder $R^3$.

As shown by dotted lines in Fig. 43, the bunter $k^5$ is of length sufficient to project beyond the forward end of the bag or package $p^2$ when the horizontal arm of lever $A^4$ is bearing against the rear end thereof, and it will also be noted that the bunter is cut away on its upper side to within a short distance of its forward or outer end. The end portion, which is not cut away, rises high enough to encounter the projecting end of axle $q^5$ of the paste-roller $r^5$ or other suitable projection and to swing the paste-box upward before it, so that the said roller $r^5$ may not apply paste to the forward end of the bag. As soon, however, as the reduced portion of bunter $k^5$ comes beneath said axle or other projection the paste-box swings back and its roller $r^5$ applies paste to the upper side of the bag or package $p^2$, which is then carried to and left beneath the label-holder $R^3$, as mentioned. The slide $Z^3$ now returns or moves backward, and as the paste-box cannot swing in that direction the bunter is depressed, lever $A^4$ rocking upon its pivot and compressing spring $m^5$, which restores the bunter to its normal position after the bunter clears the axle or other projection of the paste-box. Just after the bag or package $p^2$ is delivered beneath the label-holder $R^3$ said holder is lowered by the lever $V^3$, as before explained, the holder hanging upon the lever by the studs $s^5$ until the holder itself reaches and rests upon the package. When the descent of the holder is thus arrested, the lever $V^3$ bears upon crossbar $b^5$, which, being locked by the dog $f^3$ to the follower $T^3$, presses said follower down upon the labels in the holder and causes them to bow or bulge downward, as in Fig. 51, and the bottom one to touch and firmly bear upon the paste-covered face of the bag or package at all points except where the lips or plates $y^4$ intervene. The bottom label being thus firmly pressed upon the sticky surface adheres thereto and as the holder $R^3$ rises is drawn out from the holder in the manner illustrated in Figs. 52 and 53, the next one taking its place.

As indicated in Fig. 53, the ends of the label do not touch the paste-covered surface of the bag under this operation and tend to curl up somewhat by reason of the lifting action of the lips or plates $y^4$. To lay these ends down and to insure a perfect contact of all parts of the label with the bag, I provide a pressing plate or pad $H^5$, Figs. 2, 17, and 44, which is carried by a lever $I^5$, Figs. 2 and 17, and guided by a vertical stem $t^5$, Fig. 2. The plate or pad is lifted by a spring $J^5$, Figs. 2 and 44, and is drawn down at proper times by a flexible band or cord $u^5$, connected with lever $D^4$, and passing about a guiding sheave or pulley $v^5$, as seen in Fig. 44. The holder $R^3$ descends just after slide $Z^3$ completes its forward movement, or as it starts back, and the pad or plate $H^5$ is drawn down during the backward movement of said slide, getting its full effect just at the completion of such movement.

It has been explained that the slide $Z^3$ carries the bag or package to a point beneath the label-holder and then recedes, leaving it there. It will therefore be seen that the next bag or package thus carried forward will encounter the preceding one and advance it to a point beneath the plate or pad H⁵ and that a succeeding one will carry the first from the machine, deliver the second to the plate or pad H⁵, and be itself left under the holder R³. All the movements are timed to take place in proper sequence, and suitable cams and intermediate connections are shown for the purpose, but obviously these may be greatly varied, as will readily be understood by any practical machinist or mechanic. If desired, the movements may be made positive in both directions, either by the use of grooved cams or by employing two where but one is shown; but the arrangement shown and described is deemed best.

As stated elsewhere, power is applied to the driving-shaft P' by a band or belt passing about a band-wheel K⁵ thereon, and motion is transmitted from shaft P' to wheel O' by a pinion c². (See Figs. 1, 10, and 13.) By the same pinion c² motion is transmitted to a gear-wheel L⁵, which is carried by a shaft M⁵, bearing also a brake-wheel N⁵.

O⁵ indicates a brake-band which passes about wheel N⁵ and has one end attached to a fixed support and the other end connected with a lever P⁵, which is pivotally connected with a longitudinally-movable rod or bar Q⁵, carried in suitable guides and having a lateral arm (seen in Figs. 10 and 13) which has a swivel connection with the hub of the toggle mechanism of a friction-clutch by which the band-wheel K is made to turn with or is released from shaft P'. The lever P⁵ extends to a point near the stand of the operator who supplies the bags or places them upon the forms, so that he may readily disconnect the machine from the prime motor and simultaneously apply the brake O⁵ to bring the parts promptly to rest.

R⁵ is a horizontal lever extending toward the stamping and labeling mechanism, as seen in Figs. 1 and 13, pivoted on table or platform I and connected with rod or bar Q⁵, so that the machine may be stopped and started from either side or end of the machine at will.

Shaft P' gives motion through suitable gearing to a shaft S⁵ at the right-hand side of the machine, which is in turn geared to shaft L², carrying most of the cams of the stamping and labeling mechanism.

To permit the measuring, weighing, and packing mechanism to be operated independently of the stamping and labeling mechanism, a clutch T⁵ and clutch-lever U⁵ are provided to connect and disconnect shaft L² and the gear-wheel through which it receives motion, as will be understood upon referring to Figs. 1, 10, and 13.

It is obvious that the openings through the cut-off disks C might be elongated in the direction of rotation instead of expanding the delivery-pipe B in said direction, or both may be elongated or enlarged in that direction.

With tobacco and with some other materials containing oil or moisture or likely from any other cause to adhere to the disks C guards or scrapers $u^5$ may be used to rub or clean and polish the surfaces of the disks. These are represented in Fig. 15, and consist each of a curved metal bar with a facing of rubber, felt, or other suitable material projecting slightly below the metal to bear upon the disk.

Bunter $m'$ is carried by a lever $y^5$, the lower end of which is struck by a stud $z^5$ on cam $b'$, which makes one revolution for each advance of the bag-shapes.

The shapes, forms, packing-head, and like parts are removable and interchangeable, so that the machine may be readily adapted to packages of different sizes and shapes, and the various connecting and operating devices are likewise adjustable wherever adjustment is necessary to such variations in work. Similarly the stamping and labeling mechanism is adjustable throughout for a like purpose.

In order to provide for very nice adjustment of the measures E to suit differing conditions of the material handled, the neck $a$, to which the measure is attached, is screw-threaded on its exterior and the measure is internally threaded to fit the thread of the neck, so that it may be screwed up or down and thereby shortened or lengthened with great accuracy. The upper end of the measure is slitted, so that the binding-hoop $b$ may cause it to hug neck $a$ firmly, and thus prevent accidental turning or displacement.

The measures E are preferably surrounded each by a band $b^6$, of rubber or other material, which may be slid down as it wears away, its purpose being to keep the surface of plate F clean and free from adherent matters.

While the machine is equipped to introduce cards, books of cigarette-papers, or the like, the bar U² is or may be furnished with a lifting-block $a^6$ at a point about midway between its ends to lift the paste-receptacle R², so that the mid-length of the label, which portion covers or binds in the card or book, shall be free from paste. This is desirable in order that the design or other matter upon the card or book may not be disfigured by adherence of the label. As indicated, this is optional.

If it be desired at any time to discontinue insertion of the cards or books, it is only necessary to unfasten one end of spring N³. Slide J⁵ is slotted to receive the bolt which connects it with link $v^4$ to permit adjustment for cards or books of different lengths.

The bags are provided with puckering or tying strings and these usually bear a tag or label. These are quite apt to get in the way of other parts when the bags are in the form-wheel. Hence hooks or pins $c^6$, Fig. 10, are provided over or about which to fasten the strings after they are tied.

I have spoken of the flexible hopper as having its delivery end extended slightly into the pipe B, and this is the preferred arrangement, but it may terminate just a little above the pipe B. The important point is that the flexible hopper is left free to change shape at the delivery mouth or outlet.

Follower or head $k^3$ is shown and described as carried by slide or block W', but this is merely for convenience. It may obviously be independently guided and actuated, and in various other respects the details of construction may be varied without departing from the spirit of my invention. Thus pads, sponge, or equivalent means for applying paste or moisture may be employed in lieu of the rollers shown and described, the stamp and label holders, grippers, and actuating devices may be changed as to position, guide-bars of any desired section may be employed, and like changes of construction may be made without at all departing from the invention.

Having thus described my invention, I claim—

1. In combination with apparatus for measuring or weighing matters liable to bridge across the containing-receptacle, a flexible hopper, free at its delivery end and adapted to yield and destroy the arch or bridge formed by the material within it.

2. In combination with a feed-pipe B, a flexible hopper A above said pipe and disconnected therefrom, substantially as and for the purpose set forth.

3. In combination with a measure or receptacle, a rotatable disk carrying said receptacle and having an opening for the passage of material into the same, and a delivery-pipe having its delivery end in close proximity to the upper face of the disk and elongated or expanded in the direction of rotation thereof, whereby a longer time is given the material to pass through the disk into the measure.

4. In combination with a delivery-pipe, a rotatable cut-off disk beneath the same provided with an opening for the passage of material from the outlet-opening of the pipe; one of said openings being expanded or enlarged in the direction of rotation.

5. In a measuring apparatus, the combination of a delivery-spout or conductor; a vertically-adjustable cut-off disk beneath the same, provided with an opening for passage of material; a measure detachably secured to the disk below its opening; and a fixed plate or false bottom beneath the measure; substantially as described and shown.

6. In a measuring apparatus, the combination of a delivery-spout or conductor; a vertically-adjustable cut-off disk beneath the same, provided with an opening for passage of material; a measure detachably secured to the under side of the disk; and a fixed plate or false bottom beneath the measure; the disk and plate being relatively adjustable to accommodate measures of different lengths.

7. In combination with a rotatable threaded shaft; a delivery-spout or conductor; a disk encircling said shaft and provided with an opening for passage of material; nuts screwed upon the shaft above and below the disk; a measure carried by said disk, beneath its opening; and a fixed plate or false bottom beneath the measure.

8. In combination with a shaft, a cut-off disk adjustably mounted thereon and provided with an opening for the passage of material; a telescopic pipe or conductor above the disk and adjustable therewith; a measure carried by the disk beneath its opening; and a fixed plate or false bottom beneath the measure.

9. In combination with a weighing apparatus; a pipe or conductor; a cut-off disk beneath said conductor, provided with an opening for the passage of material; a measure carried by the disk, beneath its opening; and a plate or false bottom below the measure; the plate or false bottom being fixed relatively to the weighing apparatus, and the cut-off disk being adjustable relatively to the plate; whereby measures of varying capacity may be introduced between them without varying the distance between the measure and the weighing apparatus.

10. In combination with rotatable disk C, provided with an opening and with a neck or collar $a$ surrounding said opening, measure E encircling said collar; and clamping-band $b$ encircling the measure and serving to bind it to the collar, substantially as set forth.

11. In combination with shaft D, disk C adjustable upon said shaft; measure E carried by the disk; and fixed plate F beneath the measure; threaded post or stem T; bar S; pipe or conductor B attached to and movable with bar S; and a nut U serving to raise and lower the bar S and the pipe B, substantially as described and shown.

12. In combination with spout or conductor B; and rotatable disk C beneath the same, provided with measure E; guard $w^5$, resting upon the disk and serving to remove adhering matter from its face, substantially as set forth.

13. In combination with a scale-pan and its counterbalanced scale-beam; a measure arranged to deliver its charge into the scale-pan; and a continuously-rotating cam arranged to lock the scale-beam during delivery of the charge thereto, and immediately thereafter to release the beam.

14. In combination with scale-beam K having arm or extension $s$, and provided with a pan; rotatable shaft D provided with collar $v$, having elevation $w$ to ride beneath the extension $s$ and to sustain the scale-beam while the same is receiving its main charge.

15. In combination with scale-beam K provided with a pan or receptacle and extension $s$; rotatable shaft D provided with collar $u$, and with collar $v$ having elevation $w$; whereby the rise of the beam is limited, and its fall is at certain times prevented.

16. In combination with a scale-beam provided with a pan or receptacle; a rotatable shaft provided with a disk having an opening for passage of material through it; a spout or conductor above the disk; a measure carried by the disk, below its opening; a fixed plate or false bottom beneath the measure; and a collar carried by the rotatable shaft and provided with an elevation arranged to pass under the scale-beam at the time that the measure rides off the fixed plate or false bottom and thereafter to pass beyond the beam; whereby the scale-beam is upheld against the momentum of the charge, but is freed after the charge is received from the measure.

17. In combination with a weighing apparatus; a measuring apparatus adapted to deliver thereto a charge slightly less than that for which the weighing apparatus is adjusted; an auxiliary charging apparatus adapted to add material to the charge in the weighing apparatus in minute quantities; a friction-drive for said auxiliary apparatus; and a lock or detent connected with the beam of the weighing apparatus and serving to hold the auxiliary apparatus out of action when the charge is brought to the weight for which the weighing apparatus is adjusted.

18. In combination with a weighing apparatus; a measuring apparatus adapted to deliver to the weighing apparatus a charge slightly less than that for which the weighing apparatus is set; an auxiliary feed-roll for adding material to the charge in the weighing apparatus, in small quantities; a friction-drive for said roll; and a detent connected with the weighing apparatus and serving to hold the auxiliary feed-roll out of action when the receptacle of the weighing apparatus descends under a full charge.

19. In combination with a scale-beam and its pan or receptacle; a feed-roll provided with a ratchet-wheel; a dog or detent adapted to engage said ratchet-wheel; and a connection between the scale-beam and the dog or detent; whereby said dog or detent is held out of engagement with the ratchet-wheel when the beam is elevated, and is permitted to go into engagement with the ratchet-wheel when the beam is lowered.

20. In combination with a scale-beam and its receptacle; a measuring apparatus arranged to deliver to said receptacle the bulk of its charge; mechanism adapted to sustain the beam during the introduction of said main charge but to release it after said charge is received; an auxiliary charging apparatus adapted to add to the main charge in small quantities; a detent connected with the scale-beam and serving to stop the auxiliary charging apparatus when the beam descends under full charge; and mechanism for discharging the contents of the weighing-receptacle when fully charged.

21. In combination with scale-beam K and its pan or receptacle G; self-closing gates $d$ applied to said receptacle; levers $f$ connected with said gates; actuating-lever M connected with levers $f$; and cam $r$ for actuating the lever M.

22. In combination with measuring mechanism and with weighing mechanism adapted to receive its main charge therefrom and provided with discharge-gates; means for supporting the beam of the weighing apparatus during the introduction of the main charge; an auxiliary feeding device adapted to complete the charge in the weighing-receptacle gradually; a detent connected with the beam of the weighing apparatus and serving to hold the auxiliary feeding device out of action when the beam descends; and mechanism adapted to positively open the discharge-gates of the weighing-receptacle when the auxiliary feeding device is thus held out of action.

23. In combination with a main and an auxiliary feeding device; scale-beam K and its pan G provided with self-closing gates $d$; levers $f$ connected with said gates; actuating-lever M connected with levers $f$; collar $q$ provided with cam $r$ for actuating the lever M; collar $v$ serving to support the scale-beam during the opening of gates $d$; and a detent connected with the scale-beam and serving to hold the auxiliary feed device out of action while the pan is being emptied.

24. In combination with weighing apparatus; a measuring apparatus of variable capacity having its delivery-outlet at a point close to the pan or receptacle of the weighing apparatus and fixed relatively thereto; and a telescopic feed-pipe for the measuring apparatus, whereby measures of varying height may be interposed between the feed-pipe and the delivery-point of the measure without varying said point.

25. In combination with the feed chute or hopper of a packing mechanism; a plurality of weighing mechanisms, arranged to deliver thereto alternately; and a plurality of measuring mechanisms, arranged to charge the weighing mechanisms successively; whereby the packing mechanism is supplied with its successive charges with proper frequency, and the measuring and weighing devices are given adequate time to perform their several functions with nicety.

26. In a weighing apparatus, the combination of a scale-beam; stops for said beam to insure a limited range of oscillation; a scale-pan carried by said beam and provided with self-closing gates; an actuating-lever for opening said gates; and means other than the weight of the scale-pan or its contents for operating said lever.

27. In a weighing apparatus, the combination of a beam having a limited range of movement; a pan or receptacle carried by said beam; self-closing gates applied to said pan or receptacle; a feed mechanism adapted to complete the charge of the pan by small increments; a stop device connected with the scale-beam and serving to stop the feed device when the beam descends; arms $f, f,$ connected with the gates of the pan or receptacle; a pin $g$ extending from one arm $f$ through a slot in the other; and actuating-lever M having recessed head or cap $n$ overhanging said pin.

28. In combination with scale-beam K and its pan G; gate $d$ applied to said pan; arm $f$ connected with gate $d$ and provided with pin $g$; and lever M having recessed head or cap $n$ to receive said pin; whereby the pan is enabled to rise and fall independently of the lever M, but said lever is enabled to actuate the gate.

29. In a machine for packing tobacco and other substances, the combination of a delivery spout or hopper; a form-wheel having forms to receive the bags; and an intermediate head provided with bag-shapes; adapted to rise and present the upper ends of the bag-shapes successively to the delivery-spout; then to carry them to and insert their lower ends and the bags upon them into the forms of the form-wheel; then to withdraw the shapes from the bags within the forms; and finally to return to the first position.

30. In a packing-machine, the combination of a rotatable horizontal head or shape carrier provided with a series of bag-shapes; means for rotating the same with a step-by-step motion; means for lowering and raising the head after each step of rotation; a form to receive the bag-shapes and the bags upon them; and a reciprocating head or plunger adapted to enter each shape in succession while the shapes and the bags are held within the form.

31. In a packing-machine, the combination of a rotatable head or shape carrier provided with a series of bag-shapes; means for rotating the same with a step-by-step motion; mechanism for lowering and elevating the head after each step of rotation; a form-wheel provided with a series of forms to receive the bag-shapes and bags; a reciprocating plunger adapted to enter each bag-shape in succession while the shape and the bag are held in the form; and mechanism for rotating the form-wheel with a step-by-step motion, whereby its forms shall be successively brought to position to receive the successive bag-shapes.

32. In combination with form-wheel G' provided with a series of forms $n'$, and studs or pins $q'$; a lever I' provided with a laterally-swinging nose or pawl $p'$ beveled on its side face, and with a spring to hold said pawl in alinement with the body of the lever; and a cam $r'$ adapted to lift said lever and through it to impart motion to the wheel.

33. In combination with head or shape carrier Y; foot-piece $h'$ swiveled to its lower end; shoe $c'$ secured to said foot-piece; and cam $b'$ beneath said shoe for elevating the carrier.

34. In combination with head or shape carrier Y, its spindle X, and its elevating-cam $b'$; a ratchet wheel or disk A' encircling the spindle X of said carrier, and splined or rotatively connected therewith; a pawl-carrier movable back and forth relatively to the ratchet-disk; and a pawl mounted upon said carrier and adapted to engage therewith on its forward throw, and to rotate the ratchet-wheel and carrier.

35. In combination with rotatable carrier Y and its ratchet-disk A' provided with faces or shoulders $e'$, $g'$; pawl-carrier B' provided with pawl $d'$; and locking dog or detent $f'$, provided with a curved free end substantially as shown and described, whereby it is adapted to be withdrawn from engagement with the disk by the pawl $d'$ when the latter moves backward to its normal position.

36. In combination with a shape-carrier provided with a shape having one wall hinged and adapted to swing inward; a bunter $m$ adapted to press against said movable wall and to move it inward to prepare it to receive a bag.

37. In combination with shape-carrier Y and shape Z carried thereby; lever $y^5$ provided with bunter $m'$ to act upon the shapes; and cam $b'$ provided with stud $z^5$ to actuate said lever.

38. In combination with shape-carrier Y; ratchet-plate A'; pawl-carrier B' provided with pawl $d'$; shaft D'; cam $l'$ carried by said shaft; slotted bar C' provided with rollers $k'$ $k'$; lever E'; and connecting-rod F'. connecting lever E' and pawl-carrier B'.

39. In combination with a form within which to hold a bag while its contents are subjected to compression; a spring-pressed stud extending through a wall of the form and serving to retain the package therein after compression.

40. In combination with a form-wheel G' provided with forms $n'$; guide-rods $i^2$; cross-head $h^2$ arranged to slide thereon; ejector or follower $g^2$ carried by said cross-head; levers $j^2$ and $k^2$; link $l^2$ connecting said levers; rod $m^2$ connecting lever $k^2$ with the cross-head; cam $n^2$ acting upon lever $j^2$; and spring $o^3$ acting in opposition to cam $n^2$.

41. In combination with a form-wheel, and with an ejector to discharge the bags from the forms of said wheel; a stamp or label receptacle; a gripper adapted to withdraw a stamp or label therefrom and to suspend the same across the path of the bag; a track or way to receive and support the bag; and rollers to fold the stamp or label over the bag as the bag and stamp or label are forced between them.

42. In combination with a label or stamp receptacle adapted to hold a series of the labels or stamps in surface contact; lips or flanges projecting inward over the edges of the labels or stamps; and a detent consisting of a blade having a pointed end, a blunt face or edge rising from said point, and a cutting edge above, or back of the blunt face, said blade being secured with its pointed end projecting into the holder toward the face of the outermost label or stamp; substantially as set forth.

43. In combination with a holder or box having lips or flanges $t^2$; a follower $s^2$; and a spur or detent U' inclined relatively to the face of stamps or labels within the box, and having its lower end beveled, its longitudinal face left blunt a short distance upward from the point and brought to a knife-edge above said blunt portion, substantially as described and shown.

44. In combination with a label or stamp holder having retaining lips or flanges, and a follower to press the labels or stamps against said lips or flanges; mechanism for starting a label or stamp from the holder, comprising a fixed guide, a block or carrier movable upon said guide, a rock-shaft journaled in the carrier and provided with a claw and with a radial arm, and an actuating-bar having a cavity or recess to receive the radial arm of the rock-shaft, and adapted to move a limited distance independently of the carrier and thereafter to move with the carrier; substantially as set forth.

45. In combination with a stamp or label holder, mechanism for starting and for withdrawing stamps or labels therefrom, comprising the following elements in combination; a guide V'; head or block $A^2$ movable thereon and carrying rock-shaft $f^2$, provided with arm $g^3$ and claw $x^2$; head or block W' also movable upon guide V' and provided with fixed jaw $z^2$, and with rock-shaft $a^3$ carrying movable jaw $b^2$ and arm $c^3$; slide lifting-bar X' slotted to receive arm $g^3$ and notched to receive arm $c^3$; and means for moving bar X' longitudinally.

46. In combination with a gripping device, and with a label or stamp starting device; an actuating-bar common to both, but cut away substantially as shown and described, whereby it is caused to act upon the starting device only when nearing the end of its movement in either direction.

47. In combination with a guide; a head or block movable thereon and provided with a fixed jaw; a rock-shaft journaled in said block and provided with a movable jaw and with an arm; a slide or actuating bar notched to receive said arm; and a pin passing through a slot in the block or head and serving to limit the movement of the slide or the block either in relation to the other.

48. In combination with a guide; a head or block movable thereon and provided with a fixed jaw; a rock-shaft mounted in said block and provided with a second jaw and with an arm; a slide or actuating bar having a limited movement relatively to said block; a lifting-lever for elevating said bar; and means for lifting the block a short distance independently of the bar; whereby the rock-shaft is turned to move the second jaw away from the fixed jaw.

49. In combination with head or block W', its gripping devices, lifting or actuating bar, and inclined lug $r^3$; lever $E^2$ provided with roller $s^3$, and means substantially such as shown and described for moving said lever.

50. In combination with block $A^2$ provided with plate $p^3$; block W' provided with a gripping device; a paste-roller located near the block $A^2$; an actuating-slide X' serving to move the blocks $A^2$ and W', substantially as described; and a rod or bar $D^2$ carried by block W' and provided with lifting-pieces $n^3$ and $o^3$ to throw back the paste-roller at the termination of both movements of the slide X'.

51. In combination with a track or way having yielding portions to permit a package to be forced downward through the track; a stamp or label holder; a gripper for withdrawing a stamp or label from the holder; a reciprocating head to move a package against the suspended stamp or label and to deliver it to the yielding portion of the track or way; and a follower adapted to bear upon the package as the gripper descends and to force it through the track or way.

52. In combination with a track or way; a package-support adapted to rise to and fall away from said track or way, and recessed on its upper face; a magazine to contain cards, or books of papers; and a slide or ejector adapted to move across the bottom of the magazine and to deliver a card or book therefrom to the recessed face of the support, beneath the package thereon.

53. In combination with a track or way having yielding portions to support a bag or package; a head movable toward and from the way from above, to force a package through the same; a package-support movable to and from the way from below; and mechanism for causing said head and support to rise and fall at proper times, substantially as set forth.

54. In combination with a track or way having a yielding section; a rising-and-falling package-support beneath said section, having a depressed portion; rolls on opposite sides of said support; a stamp or label holder at one side of the package-support; a gripper normally located at the opposite side of the support, adapted to draw a stamp or label from the holder and to lay it across the rollers and over the depressed portion of the package-support; and a head or follower arranged to bear upon the package, to force it through the track, and to carry it with the stamp or label between the rollers.

55. In combination with a rising-and-falling package-support, and a head or follower to bear upon the package; rolls located on opposite sides of the package-support; means for laying a label or stamp across said rolls; and mechanism for causing the rolls to move inward over the package after the package descends between them, for the purpose of ironing down the ends of the stamp or label.

56. In a machine for applying labels or stamps to packages, the combination of a package-support, and an ironing or pressing roller having corrugations extending circumferentially around it; whereby it is adapted to press the label or stamp firmly to the package on said support without the formation of blisters.

57. In combination with rolls $Y^2 Z^2$; label-holder $G^2$; guide-bar $H^2$; carriers $I^2 J^2$; provided respectively with label starting and gripping devices; notched bar $K^2$; and mechanism, substantially such as described for imparting motion to the bar $K^2$.

58. In combination with a guide as $E^3$; slides or carriers $F^3 G^3$, movable therein and provided with studs $t^4 u^4$ and rollers $Y^2 Z^2$; springs $s^4$ tending to separate said slides or carriers; bar $H^3$ provided with slots to receive the studs $t^4 u^4$; a follower to force a package through the space between the rolls $Y^2 Z^2$; a support to sustain the package after passage between the rolls; and means substantially such as shown for reciprocating bar $H^3$ longitudinally.

59. In combination with platform $A^3$, provided with rib or guard $k^4$; lever $O^3$ adapted to engage a package lying upon said platform and to move it to a point where its forward end projects past the end of guard $k^4$; and means for vibrating said lever.

60. In combination with platform $A^3$ and its guard $k^4$; means for moving a package over said platform until its end projects beyond said guard; a bunter movable at right angles to the guard $k^4$ at a point beyond the end thereof; and means for reciprocating said bunter; whereby the package is turned at an angle to its first line of movement.

61. In combination with platform $A^3$ provided with guard $k^4$; lever $O^3$; mechanism for vibrating said lever; guide $Y^3$; slide $Z^3$ movable upon said guide; a bunter $k^5$ carried by slide $Z^3$; and means substantially such as described and shown for reciprocating said slide.

62. In combination with a label-holder; a slide and bunter adapted to move a package to a position thereunder; and a pendulous paste-receptacle located between the bunter and the label-holder; the bunter being provided with a projection at its forward end to swing the paste-receptacle upward clear of the forward end of the advancing package; but to permit it to fall and apply paste to the face of the package just after the front end has so passed.

63. In combination with a label-holder; a paste-receptacle adapted to swing upward toward said holder but incapable of swinging upward in the reverse direction; a follower adapted to carry a package beneath the paste-receptacle and to deliver it directly beneath the label-holder; an arm or bunter carried by the follower; and a spring-support for said bunter; whereby the bunter is caused to swing the paste-receptacle upward on its forward movement, but is enabled to fall and clear said receptacle on the return movement.

64. In combination with paste-receptacle $H^4$ having projection $q^5$; sliding block $Z^3$; lever $A^4$ pivoted to said block; bunter $k^5$ and arm $l^5$ projecting from said lever; and spring $m^5$ bearing against arm $l^5$, substantially as and for the purpose explained.

65. In combination with paste-receptacle $H^4$ and its roller $r^5$; label-holder $R^3$; lever $I^5$ provided with pad or plate $H^5$; a follower to move a package beneath the paste-receptacle and the label-holder successively; mechanism for depressing the label-holder upon the package; and means for thereafter pressing the pad or plate upon the package.

66. In combination with paste-receptacle $H^4$ and its delivery-roller; label-holder $R^3$; lever $V^3$, rod $W^3$, and cam $X^3$, for actuating said holder; lever $I^5$; pad $H^5$ carried by said lever; slide $Z^3$ provided with lever $A^4$ and bunter $k^5$; levers $B^4 D^4$, links $C^4$, $E^4$, cam $F^4$ and spring $G^4$ for moving slide $Z^3$; and band $u^5$ connecting the lever $I^5$ with the actuating mechanism of the slide $Z^3$.

67. A label-holder having side walls and inwardly-projecting lips at the lower edges thereof; an overhanging arm; a sleeve movable through said arm and provided with a cross-bar; a spring carried by said arm and tending to elevate the cross-bar; a stem passing through the sleeve and carrying a follower to bear upon the labels within the holder; a locking-dog carried by the cross-bar and adapted to engage the stem of the follower and to prevent its rise relatively to the cross-bar; and a lever extending over the cross-bar and beneath lugs of the holder; substantially as shown; whereby it is adapted to lift the holder bodily; to lower it; and to press down the follower independently of or relatively to the holder.

68. In combination with holder $R^3$ provided with lugs $s^5$ slots $d^5$, and lips or plates $y^4$; overhanging arm $S^3$; sleeve $a^5$ extending through said arm; cross-bar $b^5$ carried by said sleeve and provided with tenons $c^5$; a notched stem passing through the sleeve and provided with a follower $T^3$; a dog $f^5$ serving to prevent upward movement of the stem through the sleeve; a spring $U^3$ tending to lift the sleeve; and lever $V^3$ extending between the lugs $s^5$ and the cross-bar $b^5$, substantially as set forth.

69. In combination with a label-holder; a gripper for withdrawing labels therefrom; a paste-applying device located in position to apply paste to the label as it is withdrawn from the holder; and a bar provided with one or more projections to force back the paste-applying devices and thereby to prevent application of paste to a portion or portions of the label.

70. In combination with plate $F$; disk $C$; measure $E$ carried by said disk; and band $b^6$ encircling the lower end of the measure and arranged to bear upon plate $F$.

71. In a bag-packing machine, the combination with form $n'$, of hook or pin $c^6$, to receive the bag-string and hold it out of the way of other parts of the mechanism.

72. In an organized structure, the combination of mechanism for measuring and weighing a given charge; packing mechanism adapted to compress the charge and to give form to the package; means for applying to the package a stamp and label or labels; and intermediate connecting and actuating mechanism, whereby the several parts are caused to perform their respective operations in proper time and sequence.

73. In a machine for packing goods, the combination of automatic measuring and weighing mechanism; automatic packing or compressing mechanism; automatic stamp-applying mechanism; and intermediate connections, substantially such as described, whereby the several mechanisms are caused to perform their operations in proper time and sequence and without interference.

In witness whereof I hereunto set my hand in the presence of two witnesses.

RUFUS L. PATTERSON.

Witnesses:
WILLIAM W. DODGE,
HORACE A. DODGE.